(12) United States Patent
He et al.

(10) Patent No.: US 12,356,439 B2
(45) Date of Patent: Jul. 8, 2025

(54) REDUCED CAPABILITY USER EQUIPMENT OPERATIONS

(71) Applicant: QUALCOMM Incorporated, San Diego, CA (US)

(72) Inventors: Linhai He, San Diego, CA (US); Masato Kitazoe, Tokyo (JP); Ozcan Ozturk, San Diego, CA (US); Miguel Griot, La Jolla, CA (US); Peter Gaal, San Diego, CA (US); Jing Lei, San Diego, CA (US); Luis Fernando Brisson Lopes, Swindon (GB); Haris Zisimopoulos, London (GB); Arvind Vardarajan Santhanam, San Diego, CA (US); Gavin Bernard Horn, La Jolla, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 17/929,849

(22) Filed: Sep. 6, 2022

(65) Prior Publication Data

US 2023/0123249 A1    Apr. 20, 2023

Related U.S. Application Data

(60) Provisional application No. 63/262,549, filed on Oct. 14, 2021.

(51) Int. Cl.
*H04W 72/51* (2023.01)
*H04W 8/22* (2009.01)
(Continued)

(52) U.S. Cl.
CPC ............. *H04W 72/51* (2023.01); *H04W 8/22* (2013.01); *H04W 36/24* (2013.01); *H04W 48/08* (2013.01); *H04W 76/10* (2018.02)

(58) Field of Classification Search
None
See application file for complete search history.

(56) References Cited

U.S. PATENT DOCUMENTS

| 2022/0061098 | A1* | 2/2022 | Choi ..................... H04L 5/0094 |
| 2023/0180110 | A1* | 6/2023 | Kim ...................... H04W 48/02 370/329 |
| 2024/0171968 | A1* | 5/2024 | Starsinic ............. H04L 65/1073 |

FOREIGN PATENT DOCUMENTS

| CN | 111918359 A | 11/2020 |
| CN | 112640530 A | 4/2021 |

(Continued)

OTHER PUBLICATIONS

CMCC: "Discussion on Identification and Access Restrictions", 3GPP TSG-RAN WG2 Meeting #115 electronic, R2-2108524, 3rd Generation Partnership Project, Mobile Competence Centre, 650, Route Des Lucioles, F-06921 Sophia-Antipolis Cedex, France, vol. RAN WG2, No. electronic, Aug. 16, 2021-Aug. 27, 2021, 4 Pages, Aug. 6, 2021, XP052034864, 2.1. Camping restriction, 2.2 Cell selection/Reselection.

(Continued)

*Primary Examiner* — Christine T Duong
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, an indication that a (Continued)

cell associated with the base station does not support reduced capability UEs, wherein the UE is capable of operating in a first mode that is associated with reduced capability UEs and a second mode that is not associated with reduced capability UEs. The UE may communicate, in the second mode, with the base station to establish a connection with the cell based at least in part on at least one of: the UE supporting one or more capabilities associated with connecting with the cell, or no cells that support reduced capability UEs being available. Numerous other aspects are described.

30 Claims, 13 Drawing Sheets

(51) Int. Cl.
    *H04W 36/24* (2009.01)
    *H04W 48/08* (2009.01)
    *H04W 76/10* (2018.01)

(56) References Cited

FOREIGN PATENT DOCUMENTS

| WO | WO-2016025836 A1 | 2/2016 |
| WO | WO-2021201741 A1 | 10/2021 |
| WO | WO-2022001632 A1 | 1/2022 |
| WO | WO-2022099520 A1 | 5/2022 |

OTHER PUBLICATIONS

Interdigital, et al., "Identification and Restriction of RedCap UEs", 3GPP TSG RAN WG1 #106-e, R1-2107812, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, 3 Pages, Aug. 6, 2021, XP052033626, 2.1 Camping restriction.

International Search Report and Written Opinion—PCT/US2022/076026—ISA/EPO—Dec. 9, 2022.

\* cited by examiner

REDUCED CAPABILITY USER EQUIPMENT OPERATIONS

CROSS-REFERENCE TO RELATED APPLICATION

This Patent Application claims priority to U.S. Provisional Patent Application No. 63/262,549, filed on Oct. 14, 2021, entitled "REDUCED CAPABILITY USER EQUIPMENT OPERATIONS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for reduced capability user equipment (UE) operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive, from a base station, an indication that a cell associated with the base station does not support reduced capability UEs, wherein the UE is capable of operating in a first mode that is associated with reduced capability UEs and a second mode that is not associated with reduced capability UEs. The one or more processors may be configured to communicate, in the second mode, with the base station to establish a connection with the cell based at least in part on at least one of: the UE supporting one or more capabilities associated with connecting with the cell, or no cells that support reduced capability UEs being available.

Some aspects described herein relate to a base station for wireless communication. The base station may include a memory and one or more processors coupled to the memory. The one or more processors may be configured to transmit, to a UE, an indication that a cell associated with the base station does not support reduced capability UEs, wherein the UE is capable of operating in a first mode that is associated with reduced capability UEs and a second mode that is not associated with reduced capability UEs. The one or more processors may be configured to communicate, with the UE that is operating in the second mode, to establish a connection with the UE based at least in part on at least one of: the UE supporting one or more capabilities associated with connecting with the cell, or no cells that support reduced capability UEs being available.

Some aspects described herein relate to a core network device for wireless communication. The core network device may include a memory and one or more processors coupled to the memory. The one or more processors may be configured to receive, from a UE, an indication the UE is capable of operating in a first mode that is associated with reduced capability UEs and a second mode that is not associated with reduced capability UEs. The one or more processors may be configured to communicate, with the UE or a cell, to enable the UE to establish a connection with the cell based at least in part on at least one of: the UE supporting one or more capabilities associated with connecting with the cell, or no cells that support reduced capability UEs being available.

Some aspects described herein relate to a method of wireless communication performed by a UE. The method may include receiving, from a base station, an indication that a cell associated with the base station does not support reduced capability UEs, wherein the UE is capable of operating in a first mode that is associated with reduced capability UEs and a second mode that is not associated with reduced capability UEs. The method may include communicating, in the second mode, with the base station to establish a connection with the cell based at least in part on at least one of: the UE supporting one or more capabilities associated with connecting with the cell, or no cells that support reduced capability UEs being available.

Some aspects described herein relate to a method of wireless communication performed by a base station. The method may include transmitting, to a UE, an indication that a cell associated with the base station does not support reduced capability UEs, wherein the UE is capable of operating in a first mode that is associated with reduced capability UEs and a second mode that is not associated with reduced capability UEs. The method may include communicating, with the UE that is operating in the second mode, to establish a connection with the UE based at least in part on at least one of, the UE supporting one or more capabilities associated with connecting with the cell, or no cells that support reduced capability UEs being available.

Some aspects described herein relate to a method of wireless communication performed by a core network device. The method may include receiving, from a UE, an indication the UE is capable of operating in a first mode that is associated with reduced capability UEs and a second mode that is not associated with reduced capability UEs. The method may include communicating, with the UE or a cell, to enable the UE to establish a connection with the cell based at least in part on at least one of, the UE supporting one or more capabilities associated with connecting with the cell, or no cells that support reduced capability UEs being available.

Some aspects described herein relate to a non-transitory computer-readable medium that stores a set of instructions for wireless communication by a UE. The set of instructions, when executed by one or more processors of the UE, may cause the UE to receive, from a base station, an indication that a cell associated with the base station does not support reduced capability UEs, wherein the UE is capable of operating in a first mode that is associated with reduced capability UEs and a second mode that is not associated with reduced capability UEs. The set of instructions, when executed by one or more processors of the UE, may cause the UE to communicate, in the second mode, with the base station to establish a connection with the cell based at least in part on at least one of: the UE supporting one or more capabilities associated with connecting with the cell, or no cells that support reduced capability UEs being available.

Some aspects described herein relate to a non-transitory computer-readable medium that stores a set of instructions for wireless communication by a base station. The set of instructions, when executed by one or more processors of the base station, may cause the base station to transmit, to a UE, an indication that a cell associated with the base station does not support reduced capability UEs, wherein the UE is capable of operating in a first mode that is associated with reduced capability UEs and a second mode that is not associated with reduced capability UEs. The set of instructions, when executed by one or more processors of the base station, may cause the base station to communicate, with the UE that is operating in the second mode, to establish a connection with the UE based at least in part on at least one of: the UE supporting one or more capabilities associated with connecting with the cell, or no cells that support reduced capability UEs being available.

Some aspects described herein relate to a non-transitory computer-readable medium that stores a set of instructions for wireless communication by a core network device. The set of instructions, when executed by one or more processors of the core network device, may cause the core network device to receive, from a UE, an indication the UE is capable of operating in a first mode that is associated with reduced capability UEs and a second mode that is not associated with reduced capability UEs. The set of instructions, when executed by one or more processors of the core network device, may cause the core network device to communicate, with the UE or a cell, to enable the UE to establish a connection with the cell based at least in part on at least one of: the UE supporting one or more capabilities associated with connecting with the cell, or no cells that support reduced capability UEs being available.

Some aspects described herein relate to an apparatus for wireless communication. The apparatus may include means for receiving, from a base station, an indication that a cell associated with the base station does not support reduced capability apparatuses, wherein the apparatus is capable of operating in a first mode that is associated with reduced capability apparatuses and a second mode that is not associated with reduced capability apparatuses. The apparatus may include means for communicating, in the second mode, with the base station to establish a connection with the cell based at least in part on at least one of, the apparatus supporting one or more capabilities associated with connecting with the cell, or no cells that support reduced capability apparatuses being available.

Some aspects described herein relate to an apparatus for wireless communication. The apparatus may include means for transmitting, to a UE, an indication that a cell associated with the base station does not support reduced capability UEs, wherein the UE is capable of operating in a first mode that is associated with reduced capability UEs and a second mode that is not associated with reduced capability UEs. The apparatus may include means for communicating, with the UE that is operating in the second mode, to establish a connection with the UE based at least in part on at least one of, the UE supporting one or more capabilities associated with connecting with the cell, or no cells that support reduced capability UEs being available.

Some aspects described herein relate to an apparatus for wireless communication. The apparatus may include means for receiving, from a UE, an indication the UE is capable of operating in a first mode that is associated with reduced capability UEs and a second mode that is not associated with reduced capability UEs. The apparatus may include means for communicating, with the UE or a cell, to enable the UE to establish a connection with the cell based at least in part on at least one of, the UE supporting one or more capabilities associated with connecting with the cell, or no cells that support reduced capability UEs being available.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
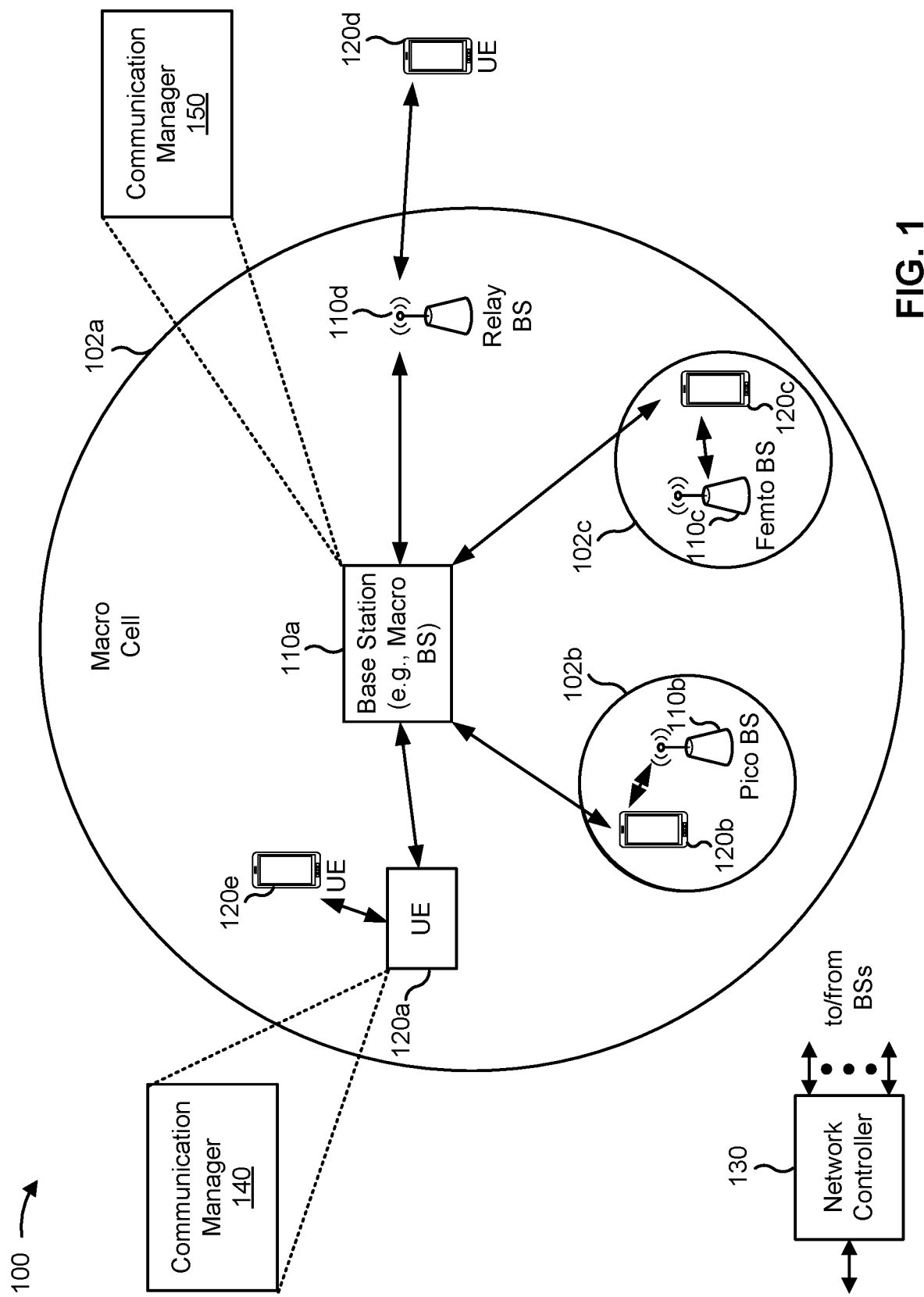
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR1-a or FR4-1, and/or FR5, or may be within the EHF band. It is contemplated that the frequencies included in these operating bands (e.g., FR1, FR2, FR3, FR4, FR1-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, an indication that a cell associated with the base station does not support reduced capability UEs, wherein the UE is capable of operating in a first mode that is associated with reduced capability UEs and a second mode that is not associated with reduced capability UEs; and communicate, in the second mode, with the base station to establish a connection with the cell based at least in part on at least one of: the UE supporting one or more capabilities associated with connecting with the cell, or no cells that support reduced capability UEs being available. Additionally, or alternatively, the communication manager 140 may perform one or more other operations described herein.

In some aspects, the base station 110 may include a communication manager 150. As described in more detail elsewhere herein, the communication manager 150 may transmit, to a UE 120, an indication that a cell associated with the base station does not support reduced capability UEs, wherein the UE is capable of operating in a first mode that is associated with reduced capability UEs and a second mode that is not associated with reduced capability UEs; and communicate, with the UE that is operating in the second mode, to establish a connection with the UE based at least in part on at least one of: the UE supporting one or more capabilities associated with connecting with the cell, or no cells that support reduced capability UEs being available. Additionally, or alternatively, the communication manager 150 may perform one or more other operations described herein.

In some aspects, a core network device may include the network controller 130. As described in more detail elsewhere herein, the network controller 130 may receive, from a UE 120, an indication the UE is capable of operating in a first mode that is associated with reduced capability UEs and a second mode that is not associated with reduced capability UEs; and communicate, with the UE or a cell, to enable the UE to establish a connection with the cell based at least in part on at least one of: the UE supporting one or more capabilities associated with connecting with the cell, or no cells that support reduced capability UEs being available. Additionally, or alternatively, the network controller 130 may perform one or more other operations described herein.

As indicated above, FIG. 1 is provided as an example. Other examples may differ from what is described with regard to FIG. 1.

Figure 2:
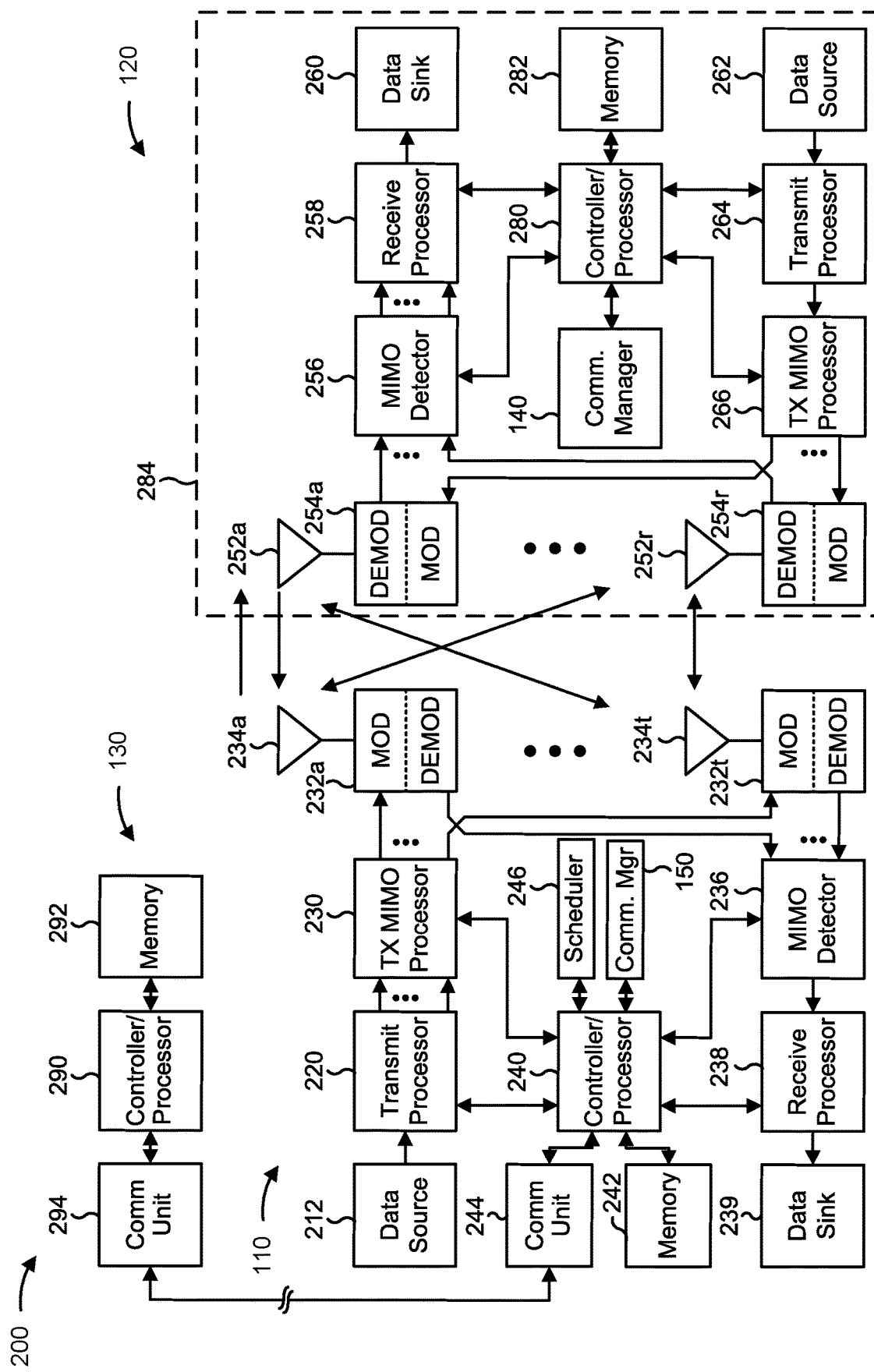
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the base station 110, the controller/processor 280 of the UE 120, and/or any other component(s) of FIG. 2 may perform one or more techniques associated with reduced capability UE operations, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving, from a base station, an indication that a cell associated with the base station does not support reduced capability UEs, wherein the UE is capable of operating in a first mode that is associated with reduced capability UEs and a second mode that is not associated with reduced capability UEs; and/or means for communicating, in the second mode, with the base station to establish a connection with the cell based at least in part on at least one of: the UE supporting one or more capabilities associated with connecting with the cell, or no cells that support reduced capability UEs being available. The means for the UE 120 to perform operations described herein may include, for example, one or more of communication manager 140, antenna 252, modem 254, MIMO detector 256, receive processor 258, transmit processor 264, TX MIMO processor 266, controller/processor 280, and/or memory 282, among other examples.

In some aspects, the base station 110 includes means for transmitting, to a UE, an indication that a cell associated with the base station does not support reduced capability UEs, wherein the UE is capable of operating in a first mode that is associated with reduced capability UEs and a second mode that is not associated with reduced capability UEs; and/or means for communicating, with the UE that is operating in the second mode, to establish a connection with the UE based at least in part on at least one of: the UE supporting one or more capabilities associated with connecting with the cell, or no cells that support reduced capability UEs being available. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, and/or scheduler 246, among other examples.

In some aspects, a core network device includes means for receiving, from a UE, an indication the UE is capable of operating in a first mode that is associated with reduced capability UEs and a second mode that is not associated with reduced capability UEs; and/or means for communicating, with the UE or a cell, to enable the UE to establish a connection with the cell based at least in part on at least one of: the UE supporting one or more capabilities associated with connecting with the cell, or no cells that support reduced capability UEs being available. In some aspects, the means for the core network device to perform operations described herein may include, for example, one or more of the network controller 130, communication unit 294, controller/processor 290, and/or a memory 292, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
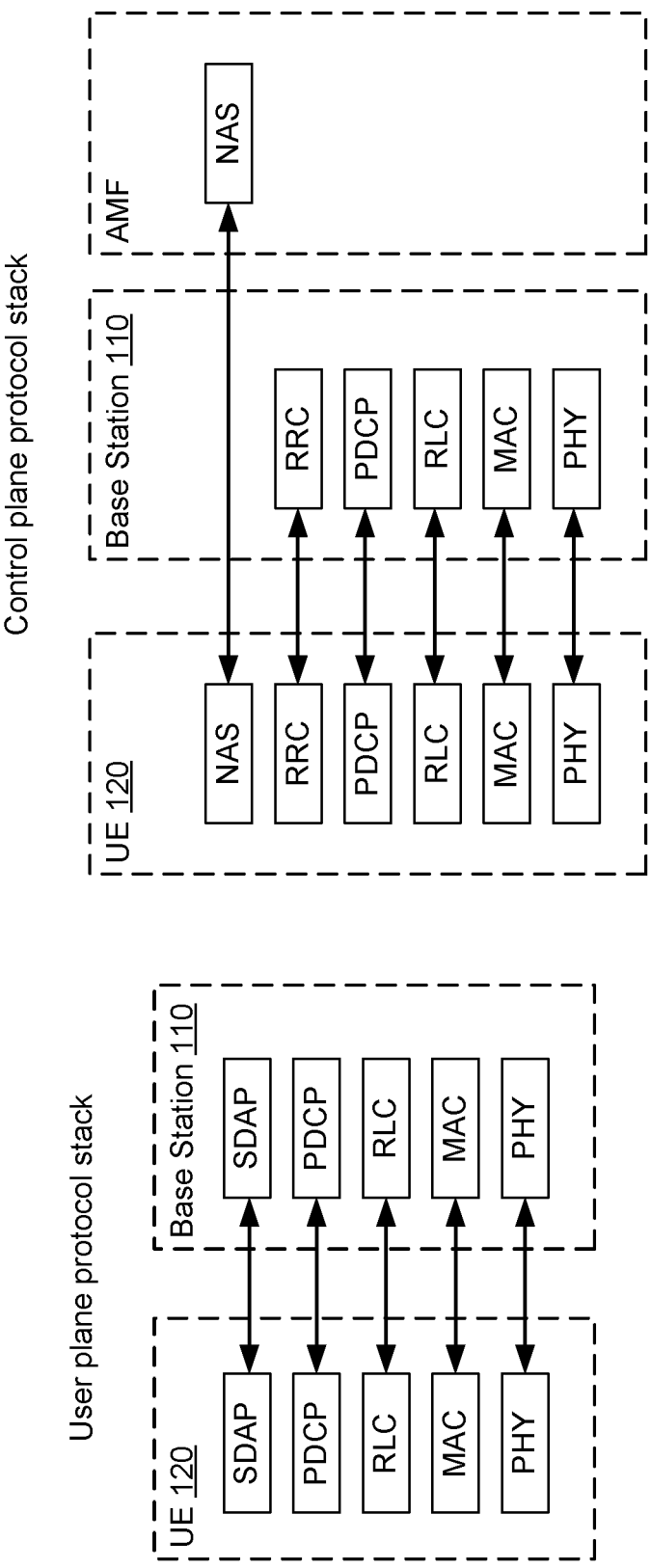
FIG. 3 is a diagram illustrating an example of a user plane protocol stack and a control plane protocol stack for a base station and a core network in communication with a UE, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the base station 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the base station 110. On the control plane, the UE 120 and the base station 110 may include respective radio resource control (RRC) layers. Furthermore, the UE 120 may include a non-access stratum (NAS) layer in communication with an NAS layer of an access and management mobility function (AMF). The AMF may be associated with a core network associated with the base station 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the base station 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some examples, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARD), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the base station 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 3 is provided as an example. Other examples may differ from what is described with regard to FIG. 3.

Figure 4:
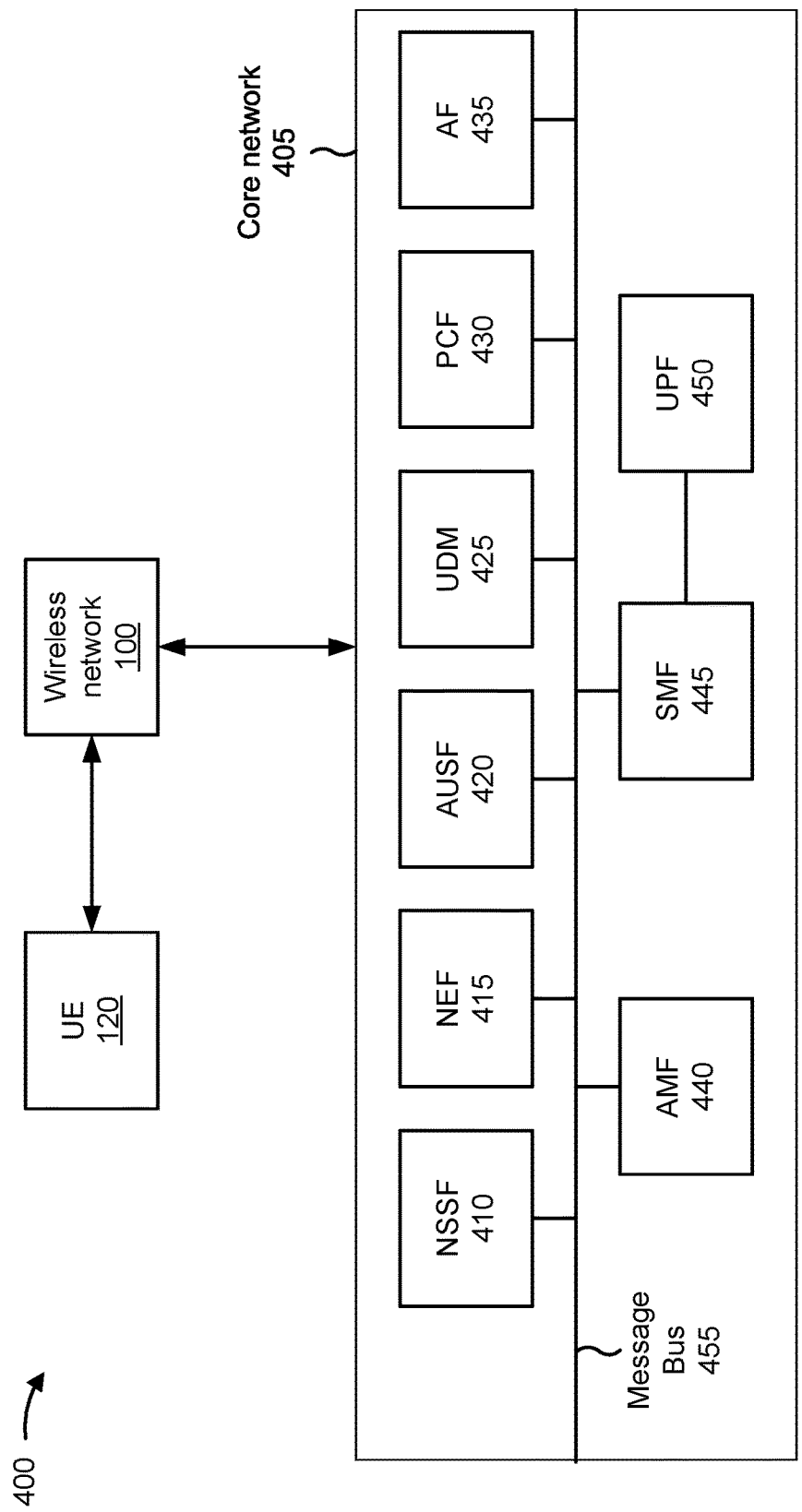
FIG. 4 is a diagram of an example of a core network, in accordance with the present disclosure.

FIG. 4 is a diagram of an example 400 of a core network 405, in accordance with the present disclosure. As shown in FIG. 4, example 400 may include a UE 120, the wireless network 100, and a core network 405. The core network 405 may be referred to herein as a "core network device." "Core network" and "core network device" may be used interchangeably herein. Devices and/or networks of example 400 may interconnect via wired connections, wireless connections, or a combination thereof.

The wireless network 100 may support, for example, a cellular RAT. The wireless network 100 may include one or more base stations (e.g., base transceiver stations, radio base stations, node Bs, eNodeBs (eNBs), gNodeBs (gNBs), base station subsystems, cellular sites, cellular towers, access points, TRPs, radio access nodes, macro-cell base stations, microcell base stations, picocell base stations, femtocell base stations, or similar types of devices) and other network entities that can support wireless communication for the UE 120. The wireless network 100 may transfer traffic between the UE 120 (e.g., using a cellular RAT), one or more base stations (e.g., using a wireless interface or a backhaul interface, such as a wired backhaul interface), and/or the core network 405. The wireless network 100 may provide one or more cells that cover geographic areas.

In some examples, the wireless network 100 may perform scheduling and/or resource management for the UE 120 covered by the wireless network 100 (e.g., the UE 120 covered by a cell provided by the wireless network 100). In some examples, the wireless network 100 may be controlled or coordinated by a network controller (e.g., network controller 130 of FIG. 1), which may perform load balancing and/or network-level configuration, among other examples. As described above in connection with FIG. 1, the network controller may communicate with the wireless network 100 via a wireless or wireline backhaul. In some examples, the wireless network 100 may include a network controller, a self-organizing network (SON) module or component, or a similar module or component. Accordingly, the wireless network 100 may perform network control, scheduling, and/or network management functions (e.g., for uplink, downlink, and/or sidelink communications of the UE 120 covered by the wireless network 100).

In some examples, the core network 405 may include an example functional architecture in which systems and/or methods described herein may be implemented. For example, the core network 405 may include an example architecture of a fifth generation (5G) next generation (NG) core network included in a 5G wireless telecommunications system. Although the example architecture of the core network 405 shown in FIG. 4 may be an example of a service-based architecture, in some examples, the core network 405 may be implemented as a reference-point architecture and/or a 4G core network, among other examples.

As shown in FIG. 4, the core network 405 may include a number of functional elements. The functional elements may include, for example, a network slice selection function (NSSF) 410, a network exposure function (NEF) 415, an authentication server function (AUSF) 420, a unified data management (UDM) component 425, a policy control function (PCF) 430, an application function (AF) 435, an AMF 440, a session management function (SMF) 445, and/or a user plane function (UPF) 450, among other examples. These functional elements may be communicatively connected via a message bus 455. Each of the functional elements shown in FIG. 4 may be implemented on one or more devices associated with a wireless telecommunications system. In some implementations, one or more of the functional elements may be implemented on physical devices, such as an access point, a base station, and/or a gateway, among other examples. In some implementations, one or more of the functional elements may be implemented on a computing device of a cloud computing environment.

The NSSF 410 may include one or more devices that select network slice instances for the UE 120. Network slicing is a network architecture model in which logically distinct network slices operate using common network infrastructure. For example, several network slices may operate as isolated end-to-end networks customized to satisfy different target service standards for different types of applications executed, at least in part, by the UE 120 and/or communications to and from the UE 120. Network slicing may efficiently provide communications for different types of services with different service standards.

The NSSF 410 may determine a set of network slice policies to be applied at the wireless network 100. For example, the NSSF 410 may apply one or more UE route selection policy (URSP) rules. In some examples, the NSSF 410 may select a network slice based on a mapping of a data network name (DNN) field included in a route selection description (RSD) to the DNN field included in a traffic descriptor selected by the UE 120. By providing network slicing, the NSSF 410 allows an operator to deploy multiple substantially independent end-to-end networks potentially with the same infrastructure. In some implementations, each slice may be customized for different services.

The NEF 415 may include one or more devices that support exposure of capabilities and/or events in the wireless telecommunications system to help other entities in the wireless telecommunications system discover network services. The AUSF 420 may include one or more devices that act as an authentication server and support the process of authenticating the UE 120 in the wireless telecommunications system.

The UDM 425 may include one or more devices that store user data and profiles in the wireless telecommunications system. In some examples, the UDM 425 may be used for fixed access and/or mobile access, among other examples, in the core network 405.

The PCF 430 may include one or more devices that provide a policy framework that incorporates network slicing, roaming, packet processing, and/or mobility management, among other examples. In some examples, the PCF 430 may include one or more URSP rules used by the NSSF 410 to select network slice instances for the UE 120.

The AF 435 may include one or more devices that support application influence on traffic routing, access to the NEF 415, and/or policy control, among other examples. The AMF 440 may include one or more devices that act as a termination point for NAS signaling and/or mobility management, among other examples. In some examples, the AMF may request the NSSF 410 to select network slice instances for the UE 120, e.g., at least partially in response to a request for data service from the UE 120.

The SMF 445 may include one or more devices that support the establishment, modification, and release of communication sessions in the wireless telecommunications system. For example, the SMF 445 may configure traffic steering policies at the UPF 450 and/or enforce user equipment internet protocol (IP) address allocation and policies, among other examples. In some examples, the SMF 445 may provision the network slice instances selected by the NSSF 410 for the UE 120.

The UPF 450 may include one or more devices that serve as an anchor point for intra-RAT and/or inter-RAT mobility. In some examples, the UPF 450 may apply rules to packets, such as rules pertaining to packet routing, traffic reporting, and/or handling user plane QoS, among other examples.

The message bus 455 may be a logical and/or physical communication structure for communication among the functional elements. Accordingly, the message bus 455 may permit communication between two or more functional elements, whether logically (e.g., using one or more application programming interfaces (APIs), among other examples) and/or physically (e.g., using one or more wired and/or wireless connections).

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of example 400 may perform one or more functions described as being performed by another set of devices of example environment 400.

As indicated above, FIG. 4 is provided as an example. Other examples may differ from what is described with regard to FIG. 4.

In some cases, a base station may serve different UEs of different categories and/or different UEs that support different capabilities. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a reduced capability (RedCap) UE, a low tier UE, and/or an NR-Lite UE, among other examples. As used herein, "reduced capability UE" or "RedCap UE" may refer generally to UEs of the first category. A UE of the first category may be, for example, an MTC UE, an eMTC UE, and/or an IoT UE, as described above in connection with FIG. 1. A UE of the second category may have an advanced feature set compared to UEs of the second category, and may be referred to as a baseline UE, a high tier UE, an NR UE, a legacy UE, and/or a premium UE, among other examples. As used herein, "non-reduced capability UE" may refer generally to UEs of the second category. In some examples, a UE of the first category has capabilities that satisfy requirements of a first (earlier) wireless communication standard but not a second (e.g., later) wireless communication standard, while a UE of the second category has capabilities that satisfy requirements of the second (later) wireless communication standard (and also the first wireless communication standard, in some cases).

For example, UEs of the first category may support a lower maximum MCS than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally, or alternatively, UEs of the second category may be capable of communicating using a shortened transmission time interval (TTI) (e.g., a slot length of 1 ms or less, 0.5 ms, 0.25 ms, 0.125 ms, 0.0625 ms, or the like, depending on a sub-carrier spacing), and UEs of the first category may not be capable of communicating using the shortened TTI.

In some cases, a base station and/or a core network may classify or treat a UE differently based on whether the UE is a reduced capability UE or a non-reduced capability UE. For example, subscription information associated with the UE (e.g., stored by the core network) may indicate whether the UE is a reduced capability UE or a non-reduced capability UE. For example, the core network and/or the base station may provision the UE with different mobility information, different policy information, different scheduling information, and/or different resource management information based on whether the UE is a reduced capability UE or a non-reduced capability UE.

Additionally, or alternatively, some cells in a wireless network may support reduced capability UEs while other cells in the wireless network may not support reduced capability UEs. For example, in order for a cell to support for reduced capability UEs, the cell may support additional operations, additional features, and/or additional configurations associated with reduced capability UEs. Therefore, some cells within the wireless network may support the additional operations, additional features, and/or additional configurations while other cells in the wireless network may not support the additional operations, additional features, and/or additional configurations. For example, a network operator may configure certain cells to support reduced capability UEs, such as cells associated with high traffic demand, and may configure other cells to not support reduced capability UEs (e.g., to conserve costs, overhead, and/or resources associated with configuring the cells to support reduced capability UEs). A reduced capability UE may be unable to establish a connection with a cell that does not support reduced capability UEs. For example, the core network and/or a base station associated with the cell may not allow a reduced UE capability (e.g., based on subscription information or mobility policy information) to establish a connection with a cell that does not support reduced capability UEs. As a result, a reduced capability UE may experience poor wireless coverage within the wireless network. For example, as the reduced capability UE physically moves through the wireless network, the reduced capability UE may travel to areas served by cells that do not support reduced capability UEs. As a result, the reduced capability UE may be unable to establish a connection with a cell in certain areas associated with the wireless network. This results in poor wireless coverage, degraded performance, increased latency, and/or a poor user experience, among other examples.

Some techniques and apparatuses described herein enable enhanced reduced capability UE operations. The enhanced reduced capability UE operations may enable a reduced capability UE (or a UE that is capable of operating with reduced capabilities) to establish a connection with a cell that does not support reduced capability UEs. For example, the reduced capability UE may be enabled to operate in a first mode or a second mode. In the first mode, the reduced capability UE may operate as a reduced capability UE (e.g., with a cell that supports reduced capability UEs). In the second mode, the reduced capability UE may operate in accordance with non-reduced capability UE procedures with a cell that does not support reduced capability UEs. In some aspects, the first mode and the second mode may not be associated with the reduced capability UE changing or modifying capabilities (e.g., hardware capabilities or radio capabilities) of the UE (e.g., the UE may have the same capabilities in the first mode and the second mode, but may operate in accordance with different procedures and/or may be classified differently, such as by the core network, when operating in the first mode or the second mode). In some other aspects, the first mode and the second mode may be associated with the UE changing or modifying capabilities (e.g., hardware capabilities or radio capabilities) of the UE. For example, the UE may be capable of operating with radio capabilities or hardware capabilities of a reduced capability UE and with radio capabilities or hardware capabilities of a non-reduced capability UE. In some cases, the reduced capability UE may follow procedures (e.g., procedures defined or otherwise fixed by a wireless communication standard, such as the 3GPP) defined for non-reduced capability UEs to enable the reduced capability UE to establish a connection with a cell that does not support reduced capability UEs.

For example, in some cases, a reduced capability UE may support one or more capabilities that are needed for establishing a connection with a cell that does not support reduced capability UEs. For example, when operating in certain frequency bands or carrier frequencies, the reduced capability UE may support one or more capabilities that are needed for establishing a connection with a cell that does not support reduced capability UEs. For example, in the FR1 band, a minimum number of receive (Rx) chains (e.g., Rx hardware chains or branches), a minimum modulation order, and/or a supported bandwidth size, among other examples, may be defined for establishing a connection with a cell. The reduced capability UE may support the capabilities for establishing the connection with the cell. Therefore, the reduced capability UE may be enabled to operate in the second mode to establish the connection with the cell that does not support reduced capability UEs.

As described herein, the reduced capability UE establishing a connection with the cell that does not support reduced capability UEs may be referred to as a fallback procedure or a fallback operation. For example, the reduced capability UE may operate in the second mode based at least in part on no cells that support reduced capability UEs being available. In other words, if the reduced capability UE is capable of connecting with a cell that supports reduced capability UEs, then the reduced capability UE may refrain from selecting and/or connecting with a cell that does not support reduced capability UEs (e.g., the reduced capability UE may refrain from operating in the second mode and/or from following the fallback procedures described herein). For example, the reduced capability UE may prioritize cells that support reduced capability UEs over cells that do not support reduced capability UEs in a cell search and/or cell selection (or re-selection) procedure. This may ensure that the reduced capability UE follows procedures defined for reduced capability UEs except for in cases where the reduced capability UE would otherwise be unable to connect with the wireless network.

In some aspects, based at least in part on operating in the second mode and/or based at least in part on establishing a connection with a cell that does not support reduced capability UEs, the reduced capability UE may transmit a message (e.g., via NAS signaling) to the core network (e.g., to the AMF) that indicates that the UE is operating in the second mode (e.g., that the UE is operating in accordance with procedures defined, or otherwise fixed, for non-reduced capability UEs). This may enable the core network to identify that the reduced capability UE is not operating in accordance with procedure defined, or otherwise fixed, for reduced capability UEs. As a result, the core network may be enabled to correctly provision the reduced capability UE, and/or accurately charge the reduced capability UE, among other examples, when the reduced capability UE is operating in accordance with procedures defined, or otherwise fixed, for non-reduced capability UEs. In some aspects, the reduced capability UE may be associated with a set of capabilities associated with the first mode and a set of capabilities associated with the second mode. In some aspects, the reduced capability UE may transmit, to the core network and/or a base station, a first capability report (e.g., associated with the set of capabilities associated with the first mode) and a second capability report (e.g., associated with the set of capabilities associated with the second mode). In some other aspects, the reduced capability UE may transmit a single capability report where capabilities that do not need to be identified for cells that do not support reduced capability UEs are included in a field of the capability report that is ignored or not decoded by cells that do not support reduced capability UEs, such as a non-critical extension (NCE) field.

In some aspects, the reduced capability UE may perform a handover procedure to establish a connection with a new cell. As part of the handover procedure, the UE may change the mode that the UE is operating in (e.g., the UE may be handed over from a cell that does not support reduced capability UEs to a cell that does support reduced capability UEs). In such examples, the reduced capability UE may transmit, to the core network (e.g., to the AMF), an indication of the new mode of the UE (e.g., via NAS signaling) after completing the handover procedure. In some aspects, if a source cell (e.g., a cell that the reduced capability UE is currently connected to) supports reduced capability UEs, then the source cell may configure a handover configuration with target cells that support reduced capability UEs (e.g., the handover configuration may configure the reduced capability UE to measure target cells that support reduced capability UEs). If the source cell determines that no cells that support reduced capability UEs are available, then the source cell may configure the handover configuration with target cells that do not support reduced capability UEs. The reduced capability UE may determine whether the UE should connect with a target cell in the first mode or the second mode based at least in part on system information associated with the target cell. If the source cell does not support reduced capability UEs, then the source cell may be unable to identify whether other cells support reduced capability UEs. Therefore, in such examples, the reduced capability UE may identify whether a new cell (e.g., after performing a handover procedure) supports reduced capability UEs. If the new cell does not support reduced capability UEs, then the reduced capability UE may autonomously (e.g., without receiving signaling from the new cell or another device) reselect to a different cell that does support reduced capability UEs (e.g., by initiating an RRC re-establishment procedure). As another example, the core network may transmit a message, via NAS signaling, to the reduced capability UE to trigger the reduced capability UE to reselect to a different cell that does support reduced capability UEs.

As a result, a reduced capability UE may be enabled to connect with cells that do not support reduced capability UEs in some scenarios. For example, when the reduced capability UE is capable of supporting one or more minimum capabilities for a cell and/or when no cells are available that support reduced capability UEs, the reduced capability UE may connect with a cell that does not support reduced capability UEs in accordance with procedures defined, or otherwise fixed, for non-reduced capability UEs. This may improve a wireless coverage, improve performance, decrease latency, and/or a improve a user experience, among other examples, of the reduced capability UE because the reduced capability UE may be enabled to connect with additional cells within the wireless network.

Figure 5:
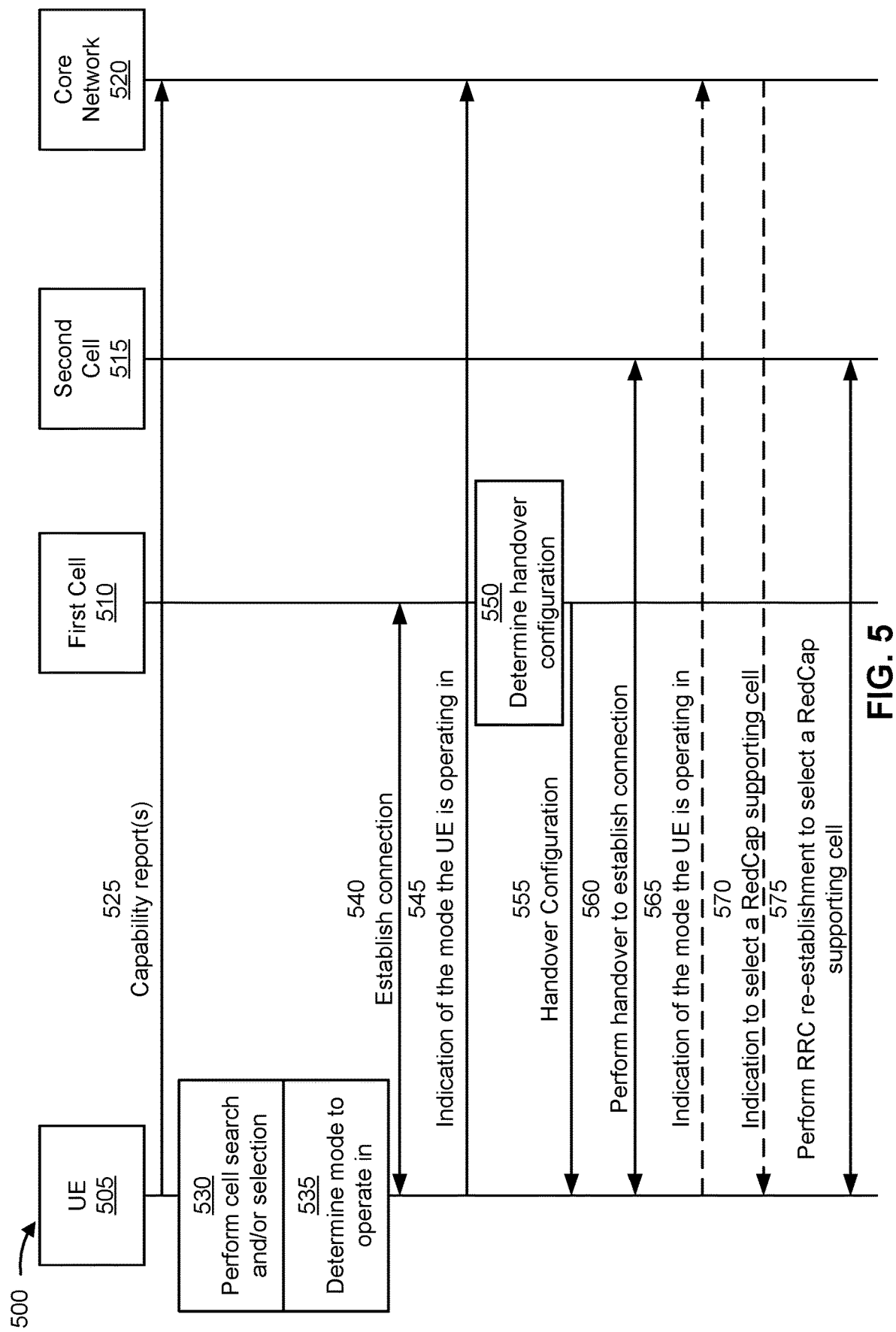
FIGS. 5 and 6 are diagrams illustrating examples associated with reduced capability UE operations, in accordance with the present disclosure.

FIG. 5 is a diagram illustrating an example 500 associated with reduced capability UE operations, in accordance with the present disclosure. As shown in FIG. 5, a UE 505 may communicate with a first cell 510, a second cell 515, and a core network 520 in a wireless network, such as the wireless network 100. The UE 505 may be a UE 120. The UE 505 may be a reduced capability UE. Each of first cell 510 and the second cell 515 may be associated with a base station 110. In some aspects, the first cell 510 may not support reduced capability UEs (e.g., the first cell 510 may not support additional operations, additional features, and/or additional configurations associated with reduced capability UEs). The core network 520 may be similar to the core network described above in connection with FIGS. 3 and 4.

In some aspects, the UE 505 may support a first mode and a second mode. As used in connection with FIG. 5, the first mode may be associated with operating as a reduced capability UE. For example, the first mode may be associated with the UE 505 operating in accordance with one or more procedures defined, or otherwise fixed (e.g., by a wireless communication standard, such as the 3GPP) for reduced capability UEs. The second mode may be associated with the UE 505 operating in accordance with one or more procedures defined, or otherwise fixed (e.g., by a wireless communication standard, such as the 3GPP) for non-reduced capability UEs (e.g., legacy UEs). For example, when operating in the first mode, the UE 505 may operate as a reduced capability UE. When operating in the second mode, the UE 505 may operate as a non-reduced capability UE (e.g., although the UE may not have the same capabilities as a non-reduced capability UE). For example, the first mode may be associated with the UE 505 operating in connection with a cell that supports reduced capability UEs. The second mode may be associated with the UE 505 operating in connection with a cell that does not support reduced capability UEs, as described herein.

For example, in some cases, one or more capabilities may be defined, otherwise fixed, for establishing a connection with a cell (e.g., a cell that does not support reduced capability UEs). For example, a wireless communication standard, such as the 3GPP, may define, or otherwise fix, one or more minimum capabilities that are required to be supported by a UE 505 in order for the UE 505 to establish a connection with a cell. For example, the one or more minimum capabilities may include a quantity of Rx chains or branches, a supported modulation order, and/or a support bandwidth, among other examples.

In some scenarios, the UE 505 (e.g., the reduced capability UE) may support the one or more minimum capabilities for establishing a connection with a cell that does not support reduced capability UEs. For example, in some frequency bands or carrier frequencies, the UE 505 (e.g., the reduced capability UE) may support the one or more minimum capabilities for establishing a connection with a cell that does not support reduced capability UEs. As an example, in the FR1 band or in bands with a carrier frequency less than or equal to 2.496 gigahertz, a minimum quantity of Rx chains or branches may be 2, a supported bandwidth may be 20 megahertz, and/or a supported modulation order may be 256 QAM for the downlink and 64 QAM for the uplink, among other examples. The UE 505 (e.g., the reduced capability UE) may support the one or more minimum capabilities for establishing a connection with a cell that does not support reduced capability UEs (e.g., in the FR1 band or in bands with a carrier frequency less than or equal to 2.496 gigahertz), but the UE 505 may be unable to establish a connection with the cell when the UE 505 is identified or classified as a reduced capability UE. For example, as described above, a classification or identification of a UE 505 (e.g., as a reduced capability UE or a non-reduced capability UE) may be static (e.g., may not change over time).

The techniques and operations described herein enable the UE 505 to operate in the second mode such that the UE 505 operates in accordance with one or more procedures defined, or otherwise fixed (e.g., by a wireless communication standard, such as the 3GPP) for non-reduced capability UEs and/or such that the UE 505 is identified or classified as a non-reduced capability UE when the UE is capable of supporting the one or more minimum capabilities for establishing a connection with a cell that does not support reduced capability UEs. In other words, if the UE 505 (e.g., the reduced capability UE) is capable of connecting with a cell that does not support reduced capability UEs in compliance with the one or more minimum capabilities (e.g., as defined, or otherwise fixed, by a wireless communication standard, such as the 3GPP) and/or no cells are available that support reduced capability UEs, then the UE 505 may operate in the second mode to enable the UE 505 to connect with a cell that does not support reduced capability UEs. As described in more detail elsewhere herein, operating in the second mode may be a fallback operation for the UE 505. In other words, whenever possible, the UE 505 may operate in the first mode (e.g., as a reduced capability UE). In some aspects, only when the UE 505 is unable to connect with a cell that supports reduced capability UEs may the UE 505 operate in the second mode. In other words, a fallback operation for reduced capability UEs may be supported that enables reduced capability UEs to camp on or access a legacy cell (e.g., a cell that does not support reduced capability UEs) as a compliant non-reduced capability UE (e.g., in compliance with one or more minimum capabilities defined, or otherwise fixed by a wireless communication standard, such as the 3GPP) when no RedCap-supporting cells are available.

Because the UE 505 is capable of operating in the first mode and the second mode, the UE 505 may be associated with different sets of capabilities to be reported to a cell (e.g., a first set of capabilities associated with the first mode and a second set of capabilities associated with the second mode). For example, a first set of radio capabilities of the UE 505 may need to be reported to cells that support reduced capability UEs and a second set of radio capabilities of the UE 505 may need to be reported to cells that do not support reduced capability UEs (e.g., where the first set of capabilities is different than the second set of capabilities). In other words, cells that support reduced capability UEs may require different indications of different radio capabilities than cells that do not support reduced capability UEs.

As shown by reference number 525, the UE 505 may transmit one or more capability reports indicating one or more capabilities associated with the UE 505. In some aspects, the UE 505 may transmit an indication (e.g., in a capability report) that the UE 505 supports operating in the first mode and the second mode. For example, a capability report may include an indication of whether the UE 505 supports operating in the first mode and the second mode. In other words, a reduced capability UE may transmit a capability report that indicates whether the reduced capability UE supports the fallback operation (e.g., to operating in the second mode as a compliant non-reduced capability UE with a cell that does not support reduced capability UEs) or whether the reduced capability UE is only capable of operating as a reduced capability UE (e.g., does not support the fallback operation described herein).

In some aspects, the one or more capabilities include a first one or more capabilities associated with operating in the first mode or a second one or more capabilities associated with operating in the second mode. For example, the UE 505 may transmit the one or more capability reports to the core network (e.g., after attaching to the wireless network). For example, the UE 505 may store two versions of a UE capability report (e.g., a first version associated with operating in the first mode and a second version associated with operating in the second mode). After the UE 505 attaches to the wireless network, the UE 505 may transmit both versions of the UE capability report (e.g., to the core network 520). For example, the UE 505 may transmit a first capability report associated with operating in the first mode. The UE 505 may transmit a second capability report associated with operating in the second mode. In such examples, the core network 520 may identify a mode in which the UE 505 is operating after establishing a connection (e.g., an RRC connection) with a cell (e.g., the first cell 510 or the second cell 515). The core network 520 may transmit, to the cell, the UE capability report associated with the operating mode of the UE 505. For example, if the UE 505 establishes the RRC connection with the cell in the first mode, then the core network 520 may transmit an indication of the first capability report to the cell. If the UE 505 establishes the RRC connection with the cell in the second mode, then the core network 520 may transmit an indication of the second capability report to the cell.

In some other aspects, the UE 505 may transmit a single capability report. For example, the single capability report may include one or more NCE fields. For example, a UE capability report container may include an NCE page or one or more NCE fields. The NCE fields or page may be a field or page of a UE capability report that is not decoded or that is ignored by some cells (e.g., cells that do not support reduced capability UEs or cells that do not support an advanced version of a wireless communication standard). The UE 505 may include capabilities associated with the first mode (e.g., associated with operating in accordance with reduced capability UE procedures) in the NCE field(s). In this way, cells (or base stations) that are configured to decode the NCE field(s), such as cells that support reduced capability UEs, may receive the information associated with the UE operating in the first mode. Additionally, cells (or base stations) that are not configured to decode the NCE field(s), such as cells that do not support reduced capability UEs, may ignore the NCE field(s) and may receive other information included in the single capability report that is associated with the UE operating in the second mode.

For example, the UE 505 may include, in an NCE field of the single capability report, a first capability that is mandatory for cells that do not support reduced capability UEs and optional for cells that do support reduced capability UEs (e.g., because mandatory capabilities do not need to be reported for the cells that do not support reduced capability UEs). For example, capabilities that are mandatory in legacy operations, but optional for RedCap operations (e.g., a maximum number of downlink MIMO layers) may be reported in the NCE field(s) of the UE radio capability container. As another example, the UE 505 may include, in an NCE field of the single capability report, a second capability that is associated first values or information for the cells that do not support reduced capability UEs and second values or information for the cells that do support reduced capability UEs, where the first values or information are different from the second values or information. For example, capabilities that are optional but have different values for both legacy operations and RedCap operations may be reported in the NCE field(s) of the UE radio capability container. In some aspects, capabilities that are optional for cells that supports reduced capability UEs and cells that do not support reduced capability UEs may be reported separately in both a legacy part and an NCE part of a UE radio capability container. For example, if a given capability is optional for both cells that supports reduced capability UEs and cells that do not support reduced capability UEs, the given capability may be indicated (e.g., in a UE capability report) separately in both a field that can be decoded by cells that do not support reduced capability UEs (e.g., in the legacy part) and in an NCE field.

In such examples, the UE 505 may transmit, to the core network 520, the single UE capability report. The core network 520 may transmit, to a cell, an indication of the single UE capability report after the UE 505 establishes an RRC connection with the cell. In this way, a cell that is not configured to decode the NCE field(s) may ignore the NCE field(s) and avoid a potential decoding error or misunderstanding of the information included in the NCE field(s).

Additionally, cells that are configured to decode the NCE field(s) may be enabled to receive the capability information included in the NCE field(s). Configuring a single UE capability report that can be properly interpreted by both cells that support reduced capability UEs and cells that do not support reduced capability UEs may reduce a complexity associated with reporting the different radio capabilities for the first mode and the second mode. Additionally, transmitting the single UE capability report may conserve radio resources that would have otherwise been used transmitting multiple UE capability reports.

As shown by reference number 530, the UE 505 may perform a cell search and/or cell selection procedure. For example, the UE 505 may measure one or more candidate cells (e.g., may measure one or more measurement objects configured for one or more candidate cells). The UE 505 may identify whether measurements of the one or more candidate cells satisfy a cell selection criteria or threshold. As used herein, a cell being "available" may refer to a measurement of the cell satisfying one or more cell selection criteria or thresholds associated with the cell. As part of the cell search and/or the cell selection procedure, the UE 505 may prioritize cells that support reduced capability UEs over cells that do not support reduced capability UEs. In other words, the UE 505 may perform a cell selection procedure or a cell re-selection procedure to identify the cell based at least in part on prioritizing cells that support reduced capability UEs over cells that do not support reduced capability UEs for the cell selection procedure or the cell re-selection procedure.

For example, the first cell 510 may not support reduced capability UEs and the second cell 515 may support reduced capability UEs. If a measurement of the second cell 515 satisfies one or more cell selection criteria or thresholds associated with the second cell 515, then the UE 505 may select the second cell 515 over the first cell 510, even if a measurement associated with the first cell 510 is associated with a higher value than the measurement associated with the second cell 515. In other words, if a cell that supports reduced capability UEs is available, then the UE 505 should select that cell over cells that do not support reduced capability UEs (e.g., even if the cells that do not support reduced capability UEs are associated with better signals or higher measurement values).

In some aspects, a cell may bar access to one or more types of UEs. For example, a cell (e.g., a base station 110 associated with the cell) may transmit an indication that reduced capability UEs are barred from accessing the cell (e.g., in a system information message). The UE 505 may refrain from accessing a cell, in the second mode, that indicates that reduced capability UEs are barred. For example, if a cell indicates that reduced capability UEs are barred from access the cell, then the UE 505 may not access the cell operating in the second mode (e.g., in accordance with procedure(s) associated with non-reduced capability UEs). For example, the UE 505 may receive, from a cell (e.g., the first cell 510 or the second cell 515), an indication that reduced capability UEs are barred from connecting with the cell. The UE 505 may refrain from establishing a connection, in the second mode, with the cell regardless of whether the UE 505 supports one or more other capabilities associated with connecting with the other cell. In other words, the UE 505 may support the minimum capabilities for establishing a connection with the cell (e.g., in the second mode), but may refrain from connecting with the cell because the cell has indicated that reduced capability UEs are barred from accessing the cell. When a cell indicates RedCap UEs are barred, a RedCap UE (e.g., the UE 505) capable of the fallback operation described herein should not attempt access to this cell as a non-RedCap UE (e.g., should not perform the fallback operation described herein).

As shown by reference number 535, the UE 505 may determine a mode to operate in based at least in part on a selected cell. For example, if the selected cell supports reduced capability UEs, then the UE 505 may determine that the UE 505 is to operate in the first mode. If the selected cell does not support reduced capability UEs, then the UE 505 may determine that the UE 505 is to operate in the second mode. For example, the UE 505 may select the first cell 510 to connect with based at least in part on performing the cell search and/or cell selection procedure as described above. As described elsewhere herein, the first cell 510 may not support reduced capability UEs. For example, the UE 505 may identify that no cells that support reduced capability UEs are available. Additionally, the UE 505 may identify that the UE 505 supports one or more capabilities (e.g., one or more minimum capabilities as defined, or otherwise fixed, by a wireless communication standard, such as the 3GPP) associated with connecting with the first cell 510. Therefore, the UE 505 may identify that the UE 505 is capable of connecting, while operating in the second mode, with the first cell 510.

As shown by reference number 540, the UE 505 may communicate, in the second mode, with the first cell 510 (e.g., with a base station 110 associated with the first cell 510) to establish a connection with the first cell 510. For example, the UE 505 may establish the connection with the first cell 510 based at least in part on the UE 505 supporting one or more capabilities associated with connecting with the first cell 510, and/or no cells that support reduced capability UEs being available, among other examples. The connection between UE 505 and the first cell 510 may an RRC connection.

As shown by reference number 545, the UE 505 may transmit, and the core network 520 may receive, an indication that the UE 505 is operating in the second mode based at least in part on establishing the connection with the first cell 510. For example, the UE 505 may transmit the indication via NAS signaling. In some aspects, the UE 505 may transmit, to an AMF associated with the core network 520, the indication that the UE 505 is operating in the second mode. For example, when a RedCap UE (e.g., the UE 505) capable of fallback operation accesses through a legacy cell (e.g., connects with the first cell 510 in the second mode), the RedCap UE should update the core network 520, via NAS signaling, that the RedCap UE is operating as a non-RedCap (e.g., that the UE 505 is operating in the second mode), to ensure that the core network 520 is enabled to properly handle the UE 505 (e.g., to ensure that the core network follows correct procedures for access restrictions, charging, and/or other procedures). For example, the core network 520 may follow different procedures for UEs that are operating as reduced capability UEs compared to procedures used for UEs that are operating as non-reduced capability UEs. However, because the first cell 510 does not support reduced capability UEs, the first cell 510 may be unable to indicate to the core network 520 that the UE 505 has connected to the first cell 510 in accordance with non-reduced capability UE procedures (e.g., may be unable to indicate to the core network 520 that the UE 505 is operating as a non-reduced capability UE within the first cell 510). Without the NAS signaling from the UE 505, the core network 520 may incorrectly follow procedures for reduced capability UEs with the UE 505 connected to the first cell 510 (e.g., even though the UE 505 is connected to the first cell 510 in accordance with non-reduced capability UE procedures) because the subscription information associated with the UE 505 (e.g., stored by the core network 520) may identify the UE 505 as a reduced capability UE 505. Therefore, the NAS signaling transmitted by the UE 505 may enable the core network to perform the correct procedures for the UE 505 when the UE 505 is connected to the first cell 510 and is operating in the second mode.

As shown by reference number 550, the first cell 510 may determine a handover configuration for the UE 505. For example, the source cell (e.g., a cell that the UE 505 has a connected RRC connection with) may determine a handover configuration for the UE 505. In the example described herein, the source cell (e.g., the first cell 510) may not support reduced capability UEs. Therefore, the source cell (e.g., the first cell 510) may be unable to identify whether other cells support reduced capability UEs. Therefore, the handover configuration may configure one or more candidate cells irrespective of whether the one or more candidate cells support reduced capability UEs. In such examples, the UE 505 may autonomously (e.g., without signaling from another device) determine to re-select to a cell that supports reduced capability UEs after a handover to another cell that does not support reduced capability UEs. Additionally, or alternatively, the core network 520 may use NAS signaling to trigger the UE 505 to re-select to a cell that supports reduced capability UEs after a handover to another cell that does not support reduced capability UEs.

In some other cases, the source cell for the UE 505 may be a cell that supports reduced capability UEs (e.g., such as when the UE 505 is operating in the first mode). In such examples, the source cell may be capable of identifying whether other cells support reduced capability UEs. Therefore, the source cell may determine the handover configuration to indicate candidate cells (e.g., neighbor cells) that support reduced capability UEs. For example, if the source cell identifies one or more candidate cells (e.g., neighbor cells) that support reduced capability UEs, then the source cell may indicate the one or more candidate cells (e.g., neighbor cells) that support reduced capability UEs in the handover configuration. If there are no candidate cells (e.g., neighbor cells) that support reduced capability UEs, then the source cell may identify if there are any candidate cells (e.g., neighbor cells) that do not support reduced capability UEs. The source cell may identify whether the UE 505 is capable of accessing an identified candidate cell that does not support reduced capability UEs (e.g., may identify whether the UE 505 supports one or more minimum capabilities associated with accessing the identified candidate cell that does not support reduced capability UEs).

As shown by reference number 555, the source cell (e.g., the first cell 510 or another cell) may transmit, and the UE 505 may receive, the handover configuration. The source cell may select a target cell for a handover procedure based at least in part on measurements indicated by the UE 505. In some aspects, such as where the source cell is a cell that supports reduced capability UEs, if there is a candidate cell that satisfies a handover condition and that supports reduced capability UEs, then the source cell may select the candidate cell as a target cell for the handover procedure. A target cell may be a cell that the UE 505 is to be handed over to as part of the handover procedure. For example, even if cells that do not support reduced capabilities are associated with a higher measurement value or a better signal, the source cell may select a candidate cell that supports reduced capability UEs as the target cell (e.g., if there is a candidate cell that supports reduced capability UEs that satisfies a handover condition). In other words, the source cell may select a target cell for a RedCap UE capable of fallback operation (e.g., the UE 505) only among RedCap-supporting neighbor cells or candidate cells, unless no such cells are available. If the source cell determines that no RedCap-supporting neighbor cells or candidate cells are available to be selected as the target cell, then the source cell may select a cell that does not support reduced capability UEs (e.g., and that the UE 505 is capable of connecting with) as the target cell. In other words, only if no cells that support reduced capability UEs are available as a target cell for a handover procedure may the source cell select a cell that does not support reduced capability UEs as the target cell for the handover procedure. If the source cell does not support reduced capability UEs, then the source cell may select a target cell irrespective of whether the target cell supports reduced capability UEs.

As shown by reference number 560, the UE 505 may perform a handover procedure to establish a connection with a new cell, such as the second cell 515. For example, the UE 505 may perform a handover procedure to establish a connection with the target cell selected by the source cell. In some aspects, as shown by reference number 565, the UE 505 may transmit, and the core network 520 may receive, an indication of a mode (e.g., the first mode or the second mode) that the UE 505 is operating in after completing the handover procedure. For example, the UE 505 may transmit the indication of the mode via NAS signaling. In some aspects, the UE 505 may transmit the indication of the mode based at least in part on the operation mode of the UE 505 changing after performing the handover procedure.

For example, the UE 505 may identify a mode to operate in based at least in part on receiving system information associated with the target cell (e.g., if the target cell supports reduced capability UEs, then the UE may operate in the first mode or if the target cell does not support reduced capability UEs, then the UE 505 may operate in the second mode). For example, when connected to the first cell 510, the UE 505 may be operating in the second mode. If the second cell 515 supports reduced capability UEs, then after completing a handover procedure to the second cell 515, the UE 505 may operate in the first mode. Because the mode in which the UE 505 is operating changes (e.g., from the second mode to the first mode) after completing the handover procedure, the UE 505 may transmit, via NAS signaling, an indication to the core network 520 of the new mode in which the UE 505 is operating. In other words, if a UE changes the operation mode after a handover, the UE should update the core network 520, via NAS signaling, with the new operation mode.

In some aspects, the UE 505 may perform a handover from the first cell 510 (e.g., that does not support reduced capability UEs) to another cell, such as the second cell 515, that also does not support reduced capability UEs. For example, when the source cell (e.g., the first cell 510) does not support reduced capability UEs, the source cell may select a target cell for the handover procedure irrespective of whether the target cell supports reduced capability UEs. Therefore, in some cases, the UE 505 may be handed over to a cell that does not support reduced capability UEs when there is an available cell that does support reduced capability UEs. Therefore, in some cases, the UE 505 may perform an action to maintain a connection with the cell (e.g., that does not support reduced capability UEs) or select a new cell (e.g., that does support reduced capability UEs).

For example, as shown by reference number 570, the core network 520 may transmit, and the UE 505 may receive, an indication to reselect to a new cell that does support reduced capability UEs (e.g., via NAS signaling). For example, the core network 520 may trigger (e.g., via NAS signaling) the UE 505 to reselect to a new cell that does support reduced capability UEs when the UE 505 has been handed over to another cell that does not support reduced capability UEs.

As another example, the UE 505 may autonomously (e.g., without receiving signaling from another device) determine to reselect to a new cell that does support reduced capability UEs when the UE 505 has been handed over to another cell that does not support reduced capability UEs. For example, the determination to reselect to a new cell that does support reduced capability UEs may be based at least in part on whether any cells that support reduced capability UEs are available, and/or an application type associated with traffic being communicated by the UE 505. For example, if the UE 505 is currently communicating delay sensitive traffic, such as voice call traffic or a video call traffic, the UE 505 may not reselect to a new cell because reselecting to the new cell may cause an interruption in the delay sensitive traffic.

As shown by reference number 575, the UE 505 may perform an action to reselect to a new cell (e.g., that does support reduced capability UEs) based at least in part on autonomously determining to reselect to the new cell and/or based at least in part on receiving a trigger (e.g., via NAS signaling) from the core network 520. For example, the UE 505 may transmit, to the current serving cell (e.g., the second cell 515), an indication of a radio link failure. The UE 505 may transmit an RRC re-establishment request to select the new cell. For example, the UE 505 may reselect to the new cell based at least in part on performing a RRC re-establishment procedure. The UE 505 may establish a connection with the new cell (e.g., that does support reduced capability UEs) based at least in part on autonomously determining to reselect to the new cell and/or based at least in part on receiving the NAS message from the core network 520.

As a result, a reduced capability UE (e.g., the UE 505) may be enabled to connect with cells that do not support reduced capability UEs in some scenarios. For example, when the reduced capability UE is capable of supporting one or more minimum capabilities for a cell and/or when no cells are available that support reduced capability UEs, the reduced capability UE may connect with a cell that does not support reduced capability UEs in accordance with procedures defined, or otherwise fixed, for non-reduced capability UEs. This may improve a wireless coverage, improve performance, decrease latency, and/or a improve a user experience, among other examples, of the reduced capability UE because the reduced capability UE may be enabled to connect with additional cells within the wireless network.

As indicated above, FIG. 5 is provided as an example. Other examples may differ from what is described with respect to FIG. 5.

Figure 6:
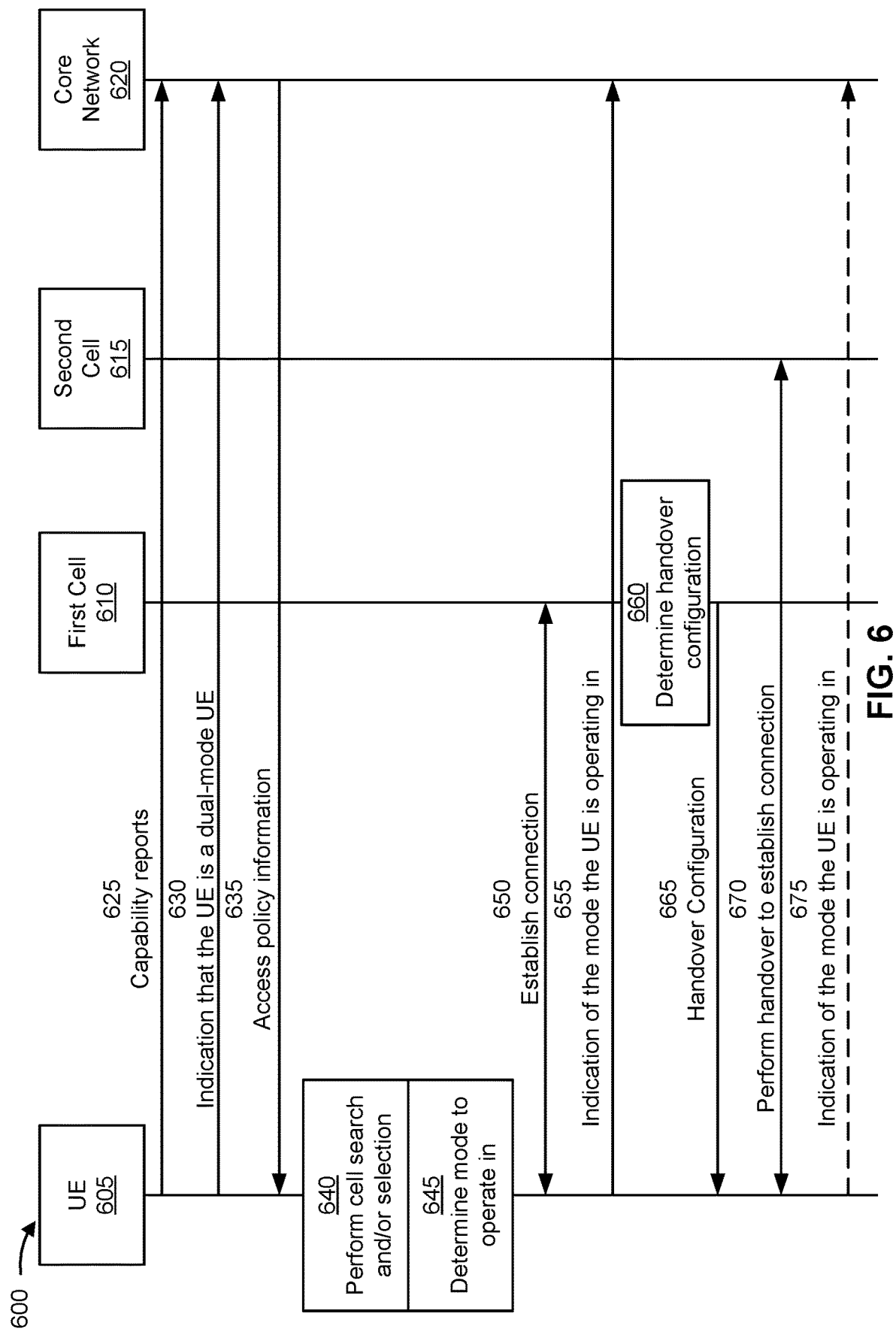

FIG. 6 is a diagram illustrating an example 600 associated with reduced capability UE operations, in accordance with the present disclosure. As shown in FIG. 6, a UE 605 may communicate with a first cell 610, a second cell 615, and a core network 620 in a wireless network, such as the wireless network 100. The UE 605 may be a UE 120. The UE 605 may be capable of operating as a reduced capability UE. Each of first cell 610 and the second cell 615 may be associated with a base station 110. In some aspects, the first cell 610 may not support reduced capability UEs (e.g., the first cell 610 may not support additional operations, additional features, and/or additional configurations associated with reduced capability UEs). The core network 620 may be similar to the core network described above in connection with FIGS. 3 and 4.

In some aspects, the UE 605 may support a first mode and a second mode. As used in connection with FIG. 6, the first mode may be associated with a first hardware capability of the UE 605 that is associated with a reduced capability. The second mode may be associated with a second hardware capability of the UE 605 that is not associated with a reduced capability. For example, the UE 605 may be a dual mode UE that is capable of modifying or changing hardware capabilities of the UE 605 (e.g., depending on whether the UE 605 is operating in the first mode or the second mode). As used herein, a UE that is capable of operating as a reduced capability UE may be a reduced capability UE (e.g., that is only capable of operating using the reduced hardware capabilities) or may be a dual mode UE that is capable of operating using the reduced hardware capabilities and that operating using enhanced or non-reduced hardware capabilities. For example, in contrast to the UE 505 as described above in FIG. 5, the UE 605 described in connection with FIG. 6 may be capable of operating using different hardware capabilities or different radio capabilities.

For example, a subscription (e.g., a network operator subscription) of the UE 605 may indicate that the UE 605 is a dual mode UE that is capable of operating in the first mode (e.g., with reduced hardware or radio capabilities) or the second mode (e.g., with non-reduced or enhanced hardware or radio capabilities). The core network 620 may store information associated with the subscription of the UE 605. In some aspects, the UE 605 may receive, from the core network 620, subscription information, associated with a subscription of the UE 605, that indicates that the UE 605 is capable of operating in the first mode and the second mode (e.g., that indicates that the UE 605 is a dual mode UE).

As shown by reference number 625, the UE 605 may transmit one or more capability reports indicating one or more capabilities associated with the UE 605. In some aspects, the UE 605 may transmit an indication (e.g., in a capability report) that the UE 605 supports operating in the first mode and the second mode. For example, a capability report may include an indication of whether the UE 605 is a dual mode UE, as described herein.

In some aspects, the one or more capabilities include a first one or more capabilities associated with operating in the first mode or a second one or more capabilities associated with operating in the second mode. For example, the UE 605 may transmit the one or more capability reports to the core network (e.g., after attaching to the wireless network). Because the UE 605 may support different hardware or radio capabilities (e.g., depending on whether the UE 605 is operating in the first mode or the second mode), the UE 605 may transmit multiple UE capability reports or may transmit a capability report indicating different versions of capabilities of the UE 605. For example, the UE 605 may store two versions of a UE capability report (e.g., a first version associated with operating in the first mode and a second version associated with operating in the second mode). After the UE 605 attaches to the wireless network, the UE 605 may transmit both versions of the UE capability report (e.g., to the core network 620). For example, the UE 605 may transmit a first capability report associated with operating in the first mode. The UE 605 may transmit a second capability report associated with operating in the second mode. In such examples, the core network 620 may identify a mode in which the UE 605 is operating after establishing a connection (e.g., an RRC connection) with a cell (e.g., the first cell

610 or the second cell 615). The core network 620 may transmit, to the cell, the UE capability report associated with the operating mode of the UE 605. For example, if the UE 605 establishes the RRC connection with the cell in the first mode, then the core network 620 may transmit an indication of the first capability report to the cell. If the UE 605 establishes the RRC connection with the cell in the second mode, then the core network 620 may transmit an indication of the second capability report to the cell.

In some aspects, a version of a capability report transmitted by the UE 605 may depend on what mode the UE 605 is operating in. For example, if the UE 605 is operating in the first mode, then the UE 605 may transmit (e.g., to a cell or to the core network 620) a first capability report associated with operating in the first mode and/or associated with operating as a reduced capability UE. If the UE 605 is operating in the second mode, then the UE 605 may transmit (e.g., to a cell or to the core network 620) a second capability report associated with operating in the second mode and/or associated with operating as a non-reduced capability UE. When the UE 605 access a cell, the core network 620 may identify the mode in which the UE 605 is operating (e.g., via an indication from a base station or the cell or via NAS signaling from the UE 605). The core network 620 (e.g., an AMF of the core network 620) may transmit, to the cell, an indication of the UE capability report that is associated with the mode in which the UE 605 is operating. In other words, when a base station or cell establishes an RRC connection with the UE 605, the core network 620 may forward (e.g., transmit) the correct version of the UE radio capabilities of the UE 605 to the base station or the cell based at least in part on in which mode the UE 605 is operating.

As shown by reference number 630, the UE 605 may transmit, and the core network 620 may receive, an indication that the UE is capable of operating in the first mode and the second mode. For example, after attaching to the wireless network, the UE 605 may indicate the dual mode capability of the UE 605 to the core network 620 (e.g., to the AMF of the core network 620) via NAS signaling. The core network 620 (e.g., to the AMF of the core network 620) may validate that the UE 605 is enabled to operating in both the first mode and the second mode. For example, the core network 620 (e.g., to the AMF of the core network 620) may determine whether subscription information associated with the UE 605 (e.g., that is stored by the core network 620) indicates that the UE 605 is permitted to operate in both the first mode and the second mode. In this way, the core network 620 may identify malicious UEs that attempt to operate in the wireless network as a dual mode UE when subscriptions of the UE do not permit the UE to operate as a dual mode UE. If the core network 620 determines that the subscription information associated with the UE 605 indicates that the UE 605 is permitted to operate in both the first mode and the second mode, then the core network 620 may perform one or more actions to enable the UE 605 to operate in both the first mode and the second mode. If the core network 620 determines that the subscription information associated with the UE 605 indicates that the UE 605 is not permitted to operate in both the first mode and the second mode, then the core network 620 may perform one or more actions to prevent or restrict the UE 605 from operating in both the first mode and the second mode. For example, the core network 620 may perform one or more actions to limit the UE 605 to operating only in the first mode (e.g., only as a reduced capability UE) or only in the second mode (e.g., only as a non-reduced capability UE).

For example, as shown by reference number 635, the core network 620 may transmit, and the UE 605 may receive, an access policy associated with the UE operating in the first mode or the second mode based at least in part on the UE 605 transmitting the indication that the UE is capable of operating in the first mode and the second mode. For example, the indication that the UE is capable of operating in the first mode and the second mode may be a request to operate in both modes in the wireless network. If the core network 620 accepts the request (e.g., based at least in part on validating that the subscription information associated with the UE 605 indicates that the UE 605 is permitted to operate in both the first mode and the second mode), then the core network 620 may transmit an access policy to the UE 605 associated with the UE 605 access cells in the first mode or the second mode. For example, the access policy may indicate whether the first mode or the second mode is to be prioritized for operations of the UE 605. For example, the access policy may indicate that the first mode (e.g., associated with operating as a reduced capability UE) is to be prioritized. In some other cases, the access policy may indicate that the second mode (e.g., associated with operating as a non-reduced capability UE) is to be prioritized. As another example, the access policy may not indicate which mode is to be prioritized or no access policy may be transmitted to the UE 605. In such examples, the UE 605 may determine in which mode to operate based at least in part on one or more factors, such as a cell barring status of a cell, a set of capabilities supported by a cell, a traffic load of a cell or the UE 605, and/or a traffic type of traffic being communicated by the UE 605, among other examples.

As shown by reference number 640, the UE 605 may perform a cell search and/or cell selection procedure. The UE 605 may perform the cell search and/or the cell selection procedure in a similar manner as described in connection with FIG. 5. For example, the UE 605 may measure one or more candidate cells (e.g., may measure one or more measurement objects configured for one or more candidate cells). The UE 605 may identify whether measurements of the one or more candidate cells satisfy a cell selection criteria or threshold. As part of the cell search and/or the cell selection procedure, the UE 605 may prioritize cells that support reduced capability UEs or may prioritize cells that do not support reduced capability UEs (e.g., based at least in part on the access policy provisioned by the core network 620). In other words, the UE 605 may perform a cell selection procedure or a cell re-selection procedure to identify the cell based at least in part on prioritizing cells that support reduced capability UEs or based at least in part on prioritizing cells that do not support reduced capability UEs for the cell selection procedure or the cell re-selection procedure. For example, the UE 605 may perform a cell selection procedure to select either a first cell (e.g., the first cell 610) that does not support reduced capability UEs or a second cell (e.g., the second cell 615) that does support reduced capability UEs. The UE 605 may operate in the first mode or the second mode based at least in part on whether the first cell or the second cell is selected.

For example, the access policy may indicate that the first mode is to be prioritized. In other words, the access policy may indicate that the UE 605 is to prioritize operating as a reduced capability UE over operating as a non-reduced capability UE. In such examples, the UE 605 may select the first cell or the second cell from a first one or more cells that support reduced capability UEs. Alternatively, the UE 605 may select the first cell or the second cell from a second one or more cells that do not support reduced capability UEs, if no cells that support reduced capability UEs are available. In other words, if the UE 605 is configured to prioritize the first mode (e.g., a reduced capability mode), then the UE 605 may first select among RedCap-supporting cells. If no RedCap-supporting cells are available, then the UE 605 may select among cells that do not support reduced capability UEs.

As another example, the access policy may indicate that the second mode is to be prioritized. In other words, the access policy may indicate that the UE 605 is to prioritize operating as a non-reduced capability UE over operating as a reduced capability UE. In such examples, the UE 605 may select the first cell or the second cell from one or more cells that include cells that support reduced capability UEs or cells that do not support reduced capability UEs. For example, a cell that supports reduced capability UEs may also support non-reduced capability UEs (e.g., there may be no reduced capability only cells). Therefore, if the UE 605 is configured to prioritize the second mode (e.g., the non-reduced capability mode), then the UE 605 may select among either cells that do not support reduced capability UEs or cells that do support reduced capability UEs. For example, if the UE 605 is configured to prioritize the second mode (e.g., the non-reduced capability mode), then the UE 605 may not differentiate or prioritize cells in the cell search and/or cell selection procedure based at least in part on whether the cells support reduced capability UEs. Rather, the UE 605 may simply prioritize operating in the second mode over operating in the first mode.

As another example, the access policy may not indicate which mode is to be prioritized or no access policy may be transmitted to the UE 605. In such examples, the UE 605 may determine (e.g., autonomously) which mode to operate in and/or which mode to prioritize. For example, the UE 605 may prioritize the first mode or the second mode in a similar manner as described above. Alternatively, the UE 605 may not prioritize either mode and may determine in which mode to operate based at least in part on one or more factors, such as the type of cell that the UE 605 is connected to, a traffic load of the UE 605, and/or a power saving status (e.g., a power level or status) of the UE 605, among other examples.

As shown by reference number 645, the UE 605 may determine in which mode to operate. For example, based at least in part on a cell selected as part of the cell search and/or cell selection procedure, the UE 605 may determine a mode. For example, if the selected cell does not support reduced capability UEs, then the UE 605 may operate in the second mode (e.g., the non-reduced capability mode). If the selected cell does support reduced capability UEs, then the UE 605 may operate in the first mode (e.g., the reduced capability mode). In some aspects, if the access policy indicates that the second mode is to be prioritized and the selected cell supports reduced capability UEs, then the UE 605 may operate in the second mode (e.g., the non-reduced capability mode) based at least in part on the access policy indicating that the second mode is to be prioritized.

As shown by reference number 650, the UE 605 may communicate, in the first mode or the second mode, with the first cell 610 (e.g., with a base station 110 associated with the first cell 610) to establish a connection with the first cell 610. For example, the UE 605 may establish the connection with the first cell 610 based at least in part selecting the first cell 610 as part of the cell search and/or cell selection procedure, as described above. Because the first cell 610 may not support reduced capability UEs, the UE 605 may operate in the second mode (e.g., the non-reduced capability mode) after establishing the connection with the first cell 610. The connection may be an RRC connection.

In some aspects, as shown by reference number 655, the UE 605 may transmit, and the core network 620 may receive, an indication of the mode in which the UE 605 is operating. For example, the UE 605 may transmit an indication that the UE is operating in the second mode based at least in part on establishing the connection with the cell that does not support reduced capability UEs. The UE 605 may transmit the indication via NAS signaling. In some aspects, if the UE 605 is operating in the first mode (e.g., with a cell that supports reduced capability UEs), then the UE 605 may transmit an indication that the UE 605 is operating as a reduced capability UE to the cell (e.g., to a base station) in a random access channel (RACH) message, such as a msg1, a msgA, or a msg3. The cell (e.g., the base station) may transmit, to the core network 620, an indication that the UE 605 is operating as a reduced capability UE based at least in part on the cell receiving the RACH message from the UE 605. In this way, the core network 620 may identify a mode in which the UE 605 is operating to enable the core network 620 to provision and/or manage the UE 605 correctly and accurately.

As shown by reference number 660, the first cell 610 (e.g., the source cell of the UE 605) may determine a handover configuration for the UE 605. If the source cell of the UE 605 supports reduced capability UEs, then the UE 605 may transmit, to the source cell, an indication of the access policy associated with the UE 605. For example, the UE 605 may transmit an indication of the access policy via a UE assistance information (UAI) message. For example, as described elsewhere herein, a cell that supports reduced capability UEs may be enabled to identify whether other cells support reduced capability UEs. Therefore, by transmitting the indication of the access policy, the source cell may be enabled to determine the handover configuration for the UE 605 based at least in part on the access policy. For example, if the access policy indicates that the first mode is to be prioritized, then the source cell may prioritize handing over the UE 605 to cells that support reduced capability UEs (e.g., if any such cells are available). If the source cell does not support reduced capability UEs, then the source cell may determine the handover configuration in a similar (or the same) manner as described above in connection with FIG. 5.

As shown by reference number 665, the UE 605 may receive an indication of a handover configuration. In some aspects, the UE 605 may receive an indication of a target cell selected by the source cell (e.g., the first cell 610) based at least in part on the handover configuration. For example, the handover configuration and/or the selected target cell may be based at least in part on the access policy of the UE 605.

As shown by reference number 670, the UE 605 may perform a handover procedure to connect with a different cell. For example, the different cell may be a target cell that is selected by the source cell. For example, the different cell may be the second cell 615. In some aspects, the UE 605 may perform the handover procedure in a similar (or the same) manner as described in connection with FIG. 5.

In some aspects, as shown by reference number 675, the UE 605 may transmit, and the core network 620 may receive, an indication of the mode the UE is operating in after performing the handover procedure. For example, if the UE 605 changes the mode in which the UE 605 is operating after performing the handover procedure, then the UE 605 may transmit an indication of the new mode to the core network 620 (e.g., via NAS signaling). For example, the UE 605 may perform a handover procedure to connect with a different cell in the first mode, where the different cell does support reduced capability UEs (e.g., after previously operating in the second mode with the source cell). The UE 605 may transmit, to the core network 620 via NAS signaling, an indication that the UE 605 is operating in the first mode based at least in part on performing the handover procedure. In some aspects, the UE 605 may notify the core network 620 of a new operating mode when changing from the first mode (e.g., the reduced capability mode) to the second mode (e.g., the non-reduced capability mode) with a cell that does not support reduced capability UEs because cell that do not support reduced capability UEs may not support notifying the core network 620 of the operation mode of the UE 605. In some other aspects, the UE 605 may notify the core network 620 of a new operating mode (e.g., via NAS signaling) whenever the UE 605 changes modes after performing a handover procedure.

As indicated above, FIG. 6 is provided as an example. Other examples may differ from what is described with respect to FIG. 6.

Figure 7:
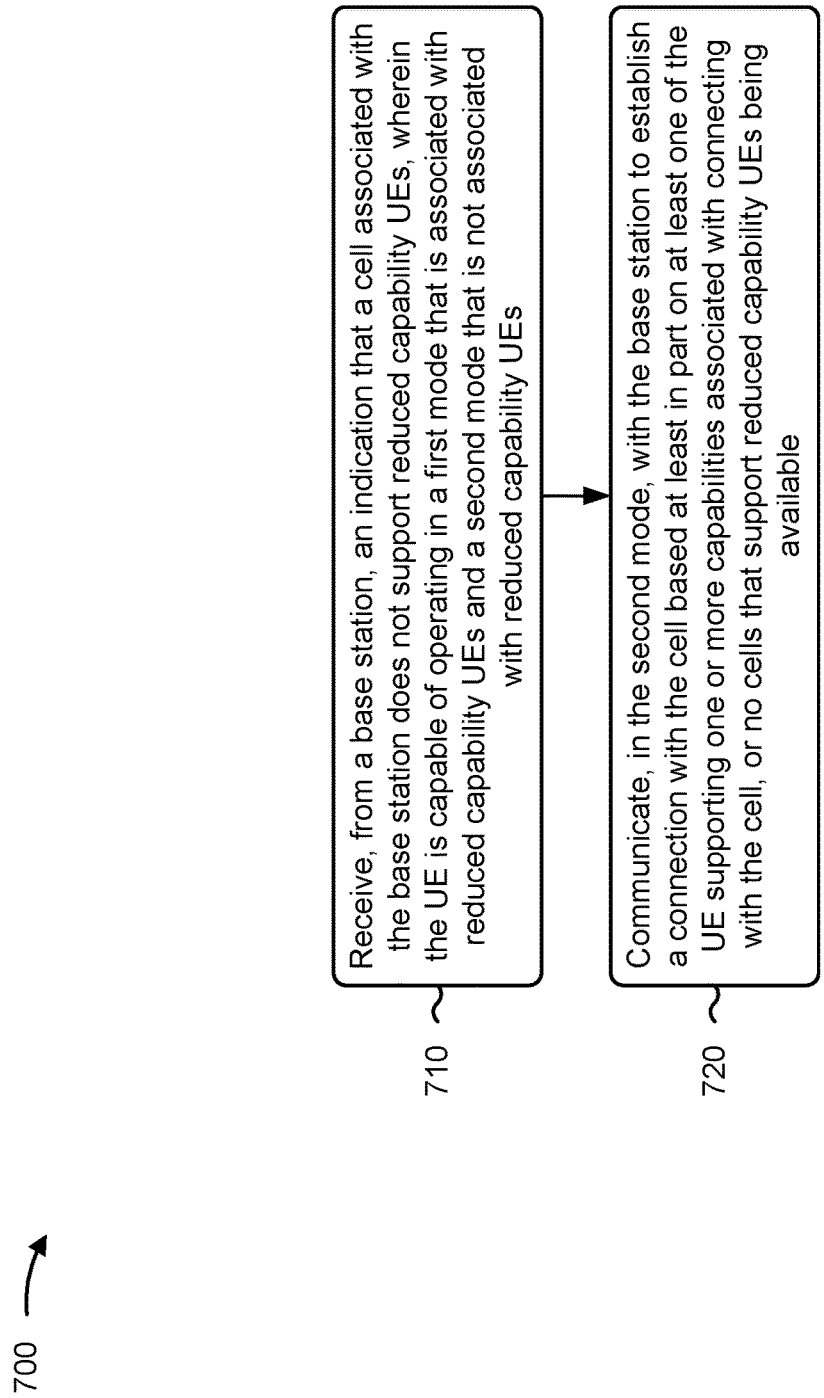
FIGS. 7-9 are diagrams illustrating example processes associated with reduced capability UE operations, in accordance with the present disclosure.

FIG. 7 is a diagram illustrating an example process 700 performed, for example, by a UE, in accordance with the present disclosure. Example process 700 is an example where the UE (e.g., UE 120, UE 505, and/or UE 605) performs operations associated with reduced capability UE operations.

As shown in FIG. 7, in some aspects, process 700 may include receiving, from a base station, an indication that a cell associated with the base station does not support reduced capability UEs, wherein the UE is capable of operating in a first mode that is associated with reduced capability UEs and a second mode that is not associated with reduced capability UEs (block 710). For example, the UE (e.g., using communication manager 140 and/or reception component 1002, depicted in FIG. 10) may receive, from a base station, an indication that a cell associated with the base station does not support reduced capability UEs, wherein the UE is capable of operating in a first mode that is associated with reduced capability UEs and a second mode that is not associated with reduced capability UEs, as described above.

As further shown in FIG. 7, in some aspects, process 700 may include communicating, in the second mode, with the base station to establish a connection with the cell based at least in part on at least one of: the UE supporting one or more capabilities associated with connecting with the cell, or no cells that support reduced capability UEs being available (block 720). For example, the UE (e.g., using communication manager 140, reception component 1002, and/or transmission component 1004, depicted in FIG. 10) may communicate, in the second mode, with the base station to establish a connection with the cell based at least in part on at least one of: the UE supporting one or more capabilities associated with connecting with the cell, or no cells that support reduced capability UEs being available, as described above.

Process 700 may include additional aspects, such as any single aspect or any combination of aspects described below and/or in connection with one or more other processes described elsewhere herein.

In a first aspect, the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

In a second aspect, alone or in combination with the first aspect, process 700 includes performing a cell selection procedure or a cell re-selection procedure to identify the cell based at least in part on prioritizing cells that support reduced capability UEs over cells that do not support reduced capability UEs for the cell selection procedure or the cell re-selection procedure.

In a third aspect, alone or in combination with one or more of the first and second aspects, process 700 includes receiving, from another cell, an indication that reduced capability UEs are barred from connecting with the other cell, and refraining from establishing a connection, in the second mode, with the other cell regardless of whether the UE supports one or more other capabilities associated with connecting with the other cell.

In a fourth aspect, alone or in combination with one or more of the first through third aspects, process 700 includes transmitting, to a core network, an indication that the UE is operating in the second mode based at least in part on establishing the connection with the cell.

In a fifth aspect, alone or in combination with one or more of the first through fourth aspects, transmitting the indication comprises transmitting, to the core network, the indication via NAS signaling.

In a sixth aspect, alone or in combination with one or more of the first through fifth aspects, transmitting the indication comprises transmitting, to an AMF associated with the core network, the indication that the UE is operating in the second mode.

In a seventh aspect, alone or in combination with one or more of the first through sixth aspects, process 700 includes transmitting one or more capability reports indicating one or more capabilities associated with the UE, wherein the one or more capabilities include a first one or more capabilities associated with operating in the first mode or a second one or more capabilities associated with operating in the second mode.

In an eighth aspect, alone or in combination with one or more of the first through seventh aspects, transmitting the one or more capability reports comprises transmitting a first capability report associated with operating in the first mode, and transmitting a second capability report associated with operating in the second mode.

In a ninth aspect, alone or in combination with one or more of the first through eighth aspects, one or more capability reports are a single capability report, and wherein the single capability report includes one or more NCE fields, and wherein the first one or more capabilities associated with operating in the first mode are indicated in the one or more NCE fields.

In a tenth aspect, alone or in combination with one or more of the first through ninth aspects, the first one or more capabilities associated with operating in the first mode include at least one of a first capability that is mandatory for cells that do not support reduced capability UEs and optional for cells that do support reduced capability UEs, or a second capability that is optional for both for cells that do support reduced capability UEs and cells that do not support reduced capability UEs.

In an eleventh aspect, alone or in combination with one or more of the first through tenth aspects, the one or more capability reports indicate that the UE supports operating in the first mode and in the second mode.

In a twelfth aspect, alone or in combination with one or more of the first through eleventh aspects, process 700 includes performing a handover procedure to connect with a different cell in the first mode, wherein the different cell does support reduced capability UEs, and transmitting, to a core network via an NAS message, an indication that the UE is operating in the first mode based at least in part on performing the handover procedure.

In a thirteenth aspect, alone or in combination with one or more of the first through twelfth aspects, process 700 includes establishing, in the first mode, a different connection with a different cell that does support reduced capability UEs, and receiving, from the different cell, a handover configuration indicating at least one of a first one or more target cells that support reduced capability UEs, or a second one or more target cells, that do not support reduced capability UEs, based at least in part on no target cells that support reduced capability UEs being available.

In a fourteenth aspect, alone or in combination with one or more of the first through thirteenth aspects, process 700 includes performing a handover procedure to connect with a different cell in the second mode, wherein the different cell does not support reduced capability UEs, and performing an action to maintain a connection with the different cell or select a new cell.

In a fifteenth aspect, alone or in combination with one or more of the first through fourteenth aspects, the action is based at least in part on at least one of whether any cells that support reduced capability UEs are available, or an application type associated with traffic being communicated by the UE.

In a sixteenth aspect, alone or in combination with one or more of the first through fifteenth aspects, performing the action comprises performing an RRC re-establishment procedure to select the new cell.

In a seventeenth aspect, alone or in combination with one or more of the first through sixteenth aspects, process 700 includes performing a handover procedure to connect with a different cell, wherein the different cell does not support reduced capability UEs, and receiving, via an NAS message, an indication to reselect to a new cell that does support reduced capability UEs.

In an eighteenth aspect, alone or in combination with one or more of the first through seventeenth aspects, process 700 includes establishing a connection with the new cell based at least in part on receiving the NAS message.

In a nineteenth aspect, alone or in combination with one or more of the first through eighteenth aspects, the first mode is associated with a first hardware capability of the UE that is associated with a reduced capability, and wherein the second mode is associated with a second hardware capability of the UE that is not associated with a reduced capability.

In a twentieth aspect, alone or in combination with one or more of the first through nineteenth aspects, communicating to establish the connection with the cell comprises communicating, based at least in part on operating in the second mode, to establish the connection with the cell.

In a twenty-first aspect, alone or in combination with one or more of the first through twentieth aspects, process 700 includes receiving subscription information, associated with a subscription of the UE, that indicates that the UE is capable of operating in the first mode and the second mode.

In a twenty-second aspect, alone or in combination with one or more of the first through twenty-first aspects, process 700 includes transmitting, to a core network, an indication that the UE is capable of operating in the first mode and the second mode, and receiving, from the core network, an access policy associated with the UE operating in the first mode or the second mode based at least in part on transmitting the indication.

In a twenty-third aspect, alone or in combination with one or more of the first through twenty-second aspects, the access policy indicates whether the first mode or the second mode is to be prioritized for operations of the UE.

In a twenty-fourth aspect, alone or in combination with one or more of the first through twenty-third aspects, process 700 includes performing a cell selection procedure to select either a first cell that does not support reduced capability UEs or a second cell that does support reduced capability UEs, and operating in the first mode or the second mode based at least in part on whether the first cell or the second cell is selected.

In a twenty-fifth aspect, alone or in combination with one or more of the first through twenty-fourth aspects, an access policy indicates that the first mode is to be prioritized, and wherein performing the cell selection procedure comprises selecting the first cell or the second cell from at least one of a first one or more cells that support reduced capability UEs, or a second one or more cells that do not support reduced capability UEs, if no cells that support reduced capability UEs are available.

In a twenty-sixth aspect, alone or in combination with one or more of the first through twenty-fifth aspects, an access policy indicates that the second mode is to be prioritized, and wherein performing the cell selection procedure comprises selecting the first cell or the second cell from one or more cells that include cells that support reduced capability UEs or cells that do not support reduced capability UEs.

In a twenty-seventh aspect, alone or in combination with one or more of the first through twenty-sixth aspects, process 700 includes transmitting, to a core network, an indication that the UE is operating in the second mode based at least in part on establishing the connection with the cell that does not support reduced capability UEs.

In a twenty-eighth aspect, alone or in combination with one or more of the first through twenty-seventh aspects, the UE is associated with a first set of capabilities for the first mode and a second set of capabilities for the second mode.

In a twenty-ninth aspect, alone or in combination with one or more of the first through twenty-eighth aspects, process 700 includes transmitting, to a core network, an indication of the first set of capabilities and an indication of the second set of capabilities.

In a thirtieth aspect, alone or in combination with one or more of the first through twenty-ninth aspects, process 700 includes transmitting an indication of the first set of capabilities if the UE is operating in the first mode, or transmitting an indication of the second set of capabilities if the UE is operating in the second mode.

In a thirty-first aspect, alone or in combination with one or more of the first through thirtieth aspects, the UE is associated with an access policy that indicates whether the first mode or the second mode is to be prioritized for operations of the UE, and process 700 includes transmitting, to the cell, an indication of the access policy via a UE assistance information message, and receiving, from the cell, a handover configuration that is based at least in part on the access policy.

In a thirty-second aspect, alone or in combination with one or more of the first through thirty-first aspects, process 700 includes performing a handover procedure to connect with a different cell in the first mode, wherein the different cell does support reduced capability UEs, and transmitting, to a core network via an NAS message, an indication that the UE is operating in the first mode based at least in part on performing the handover procedure.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
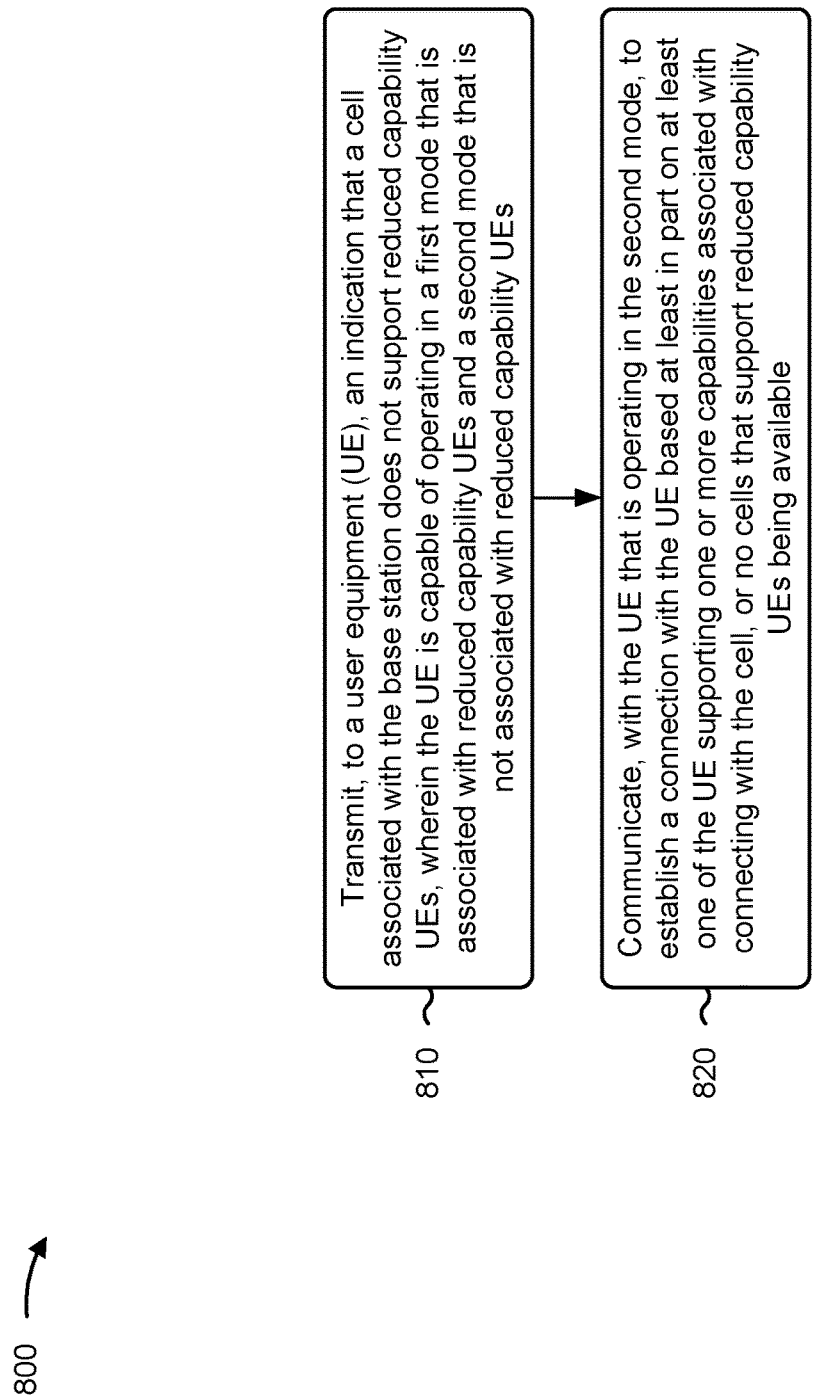

FIG. 8 is a diagram illustrating an example process 800 performed, for example, by a base station, in accordance with the present disclosure. Example process 800 is an example where the base station (e.g., base station 110, the first cell 510, the first cell 610, the second cell 515, and/or the second cell 615) performs operations associated with reduced capability UE operations.

As shown in FIG. 8, in some aspects, process 800 may include transmitting, to a UE, an indication that a cell associated with the base station does not support reduced capability UEs, wherein the UE is capable of operating in a first mode that is associated with reduced capability UEs and a second mode that is not associated with reduced capability UEs (block 810). For example, the base station (e.g., using communication manager 150 and/or transmission component 1104, depicted in FIG. 11) may transmit, to a UE, an indication that a cell associated with the base station does not support reduced capability UEs, wherein the UE is capable of operating in a first mode that is associated with reduced capability UEs and a second mode that is not associated with reduced capability UEs, as described above.

As further shown in FIG. 8, in some aspects, process 800 may include communicating, with the UE that is operating in the second mode, to establish a connection with the UE based at least in part on at least one of: the UE supporting one or more capabilities associated with connecting with the cell, or no cells that support reduced capability UEs being available (block 820). For example, the base station (e.g., using communication manager 150 reception component 1102, and/or transmission component 1104, depicted in FIG. 11) may communicate, with the UE that is operating in the second mode, to establish a connection with the UE based at least in part on at least one of: the UE supporting one or more capabilities associated with connecting with the cell, or no cells that support reduced capability UEs being available, as described above.

Process 800 may include additional aspects, such as any single aspect or any combination of aspects described below and/or in connection with one or more other processes described elsewhere herein.

In a first aspect, the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

In a second aspect, alone or in combination with the first aspect, process 800 includes receiving, from a core network, an indication that the UE is operating in the second mode based at least in part on establishing the connection with the cell.

In a third aspect, alone or in combination with one or more of the first and second aspects, receiving the indication comprises receiving, from an AMF associated with the core network, the indication that the UE is operating in the second mode.

In a fourth aspect, alone or in combination with one or more of the first through third aspects, process 800 includes receiving one or more capability reports indicating one or more capabilities associated with the UE, wherein the one or more capabilities include a first one or more capabilities associated with operating in the first mode or a second one or more capabilities associated with operating in the second mode.

In a fifth aspect, alone or in combination with one or more of the first through fourth aspects, receiving the one or more capability reports comprises receiving a first capability report associated with operating in the first mode, and receiving a second capability report associated with operating in the second mode.

In a sixth aspect, alone or in combination with one or more of the first through fifth aspects, one or more capability reports are a single capability report, and wherein the single capability report includes one or more NCE fields, and wherein the first one or more capabilities associated with operating in the first mode are indicated in the one or more NCE fields.

In a seventh aspect, alone or in combination with one or more of the first through sixth aspects, the first one or more capabilities associated with operating in the first mode include at least one of a first capability that is mandatory for cells that do not support reduced capability UEs and optional for cells that do support reduced capability UEs, or a second capability that is optional for both for cells that do support reduced capability UEs and cells that do not support reduced capability UEs.

In an eighth aspect, alone or in combination with one or more of the first through seventh aspects, the one or more capability reports indicate that the UE supports operating in the first mode and in the second mode.

In a ninth aspect, alone or in combination with one or more of the first through eighth aspects, the first mode is associated with a first hardware capability of the UE that is associated with a reduced capability, and wherein the second mode is associated with a second hardware capability of the UE that is not associated with a reduced capability.

In a tenth aspect, alone or in combination with one or more of the first through ninth aspects, communicating to establish the connection with the UE comprises communicating, based at least in part on the UE operating in the second mode, to establish the connection with the UE.

In an eleventh aspect, alone or in combination with one or more of the first through tenth aspects, process 800 includes receiving subscription information, associated with a subscription of the UE, that indicates that the UE is capable of operating in the first mode and the second mode.

In a twelfth aspect, alone or in combination with one or more of the first through eleventh aspects, the UE is associated with a first set of capabilities for the first mode and a second set of capabilities for the second mode.

In a thirteenth aspect, alone or in combination with one or more of the first through twelfth aspects, process 800 includes receiving an indication of the first set of capabilities if the UE is operating in the first mode, or receiving an indication of the second set of capabilities if the UE is operating in the second mode.

In a fourteenth aspect, alone or in combination with one or more of the first through thirteenth aspects, the UE is associated with an access policy that indicates whether the first mode or the second mode is to be prioritized for operations of the UE, and process 800 includes receiving, from the UE, an indication of the access policy via a UE assistance information message, and transmitting, to the UE, a handover configuration that is based at least in part on the access policy.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
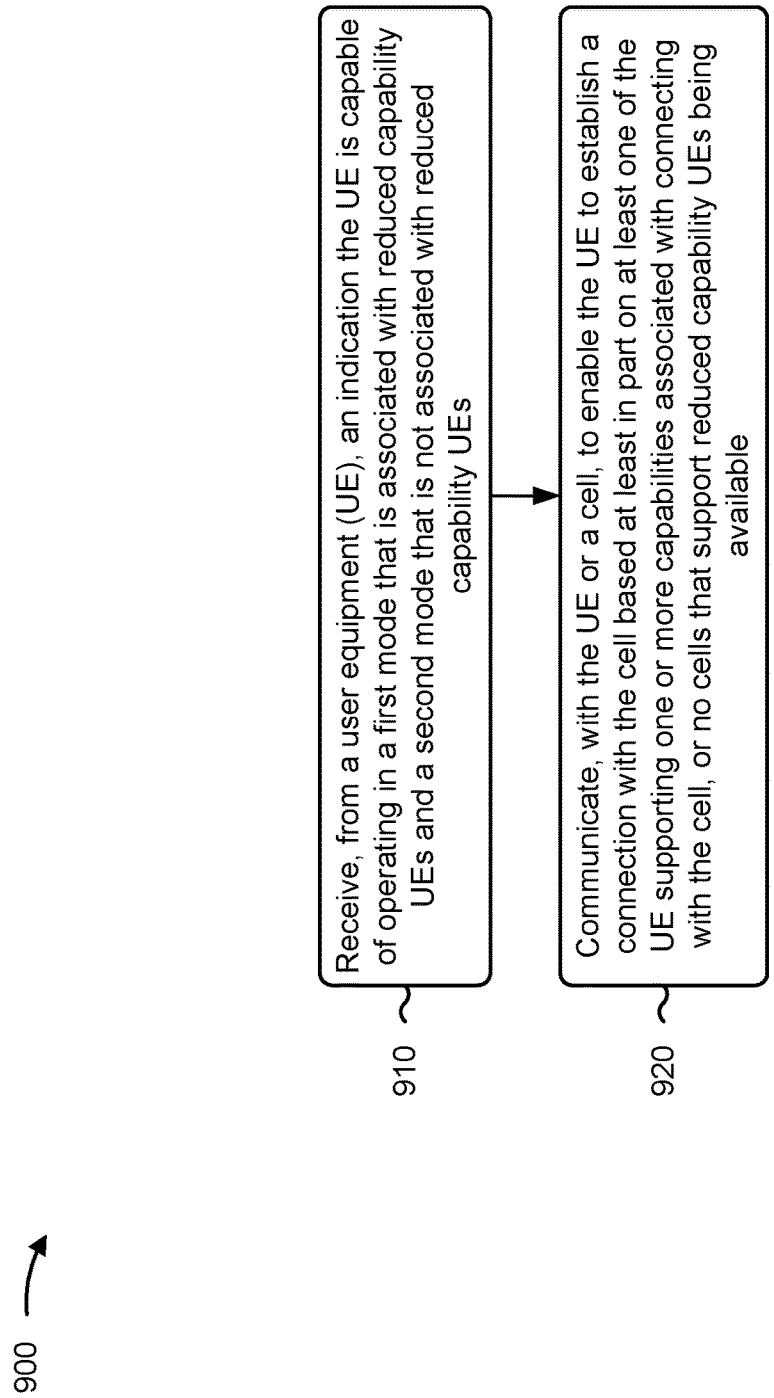

FIG. 9 is a diagram illustrating an example process 900 performed, for example, by a core network device, in accordance with the present disclosure. Example process 900 is an example where the core network device (e.g., core network 520 and/or core network 620) performs operations associated with reduced capability UE operations.

As shown in FIG. 9, in some aspects, process 900 may include receiving, from a UE, an indication the UE is capable of operating in a first mode that is associated with reduced capability UEs and a second mode that is not associated with reduced capability UEs (block 910). For example, the core network device (e.g., using network control 130 and/or reception component 1202, depicted in FIG. 12) may receive, from a UE, an indication the UE is capable of operating in a first mode that is associated with reduced capability UEs and a second mode that is not associated with reduced capability UEs, as described above.

As further shown in FIG. 9, in some aspects, process 900 may include communicating, with the UE or a cell, to enable the UE to establish a connection with the cell based at least in part on at least one of: the UE supporting one or more capabilities associated with connecting with the cell, or no cells that support reduced capability UEs being available (block 920). For example, the core network device (e.g., using network control 130, reception component 1202, and/or transmission component 1204, depicted in FIG. 12) may communicate, with the UE or a cell, to enable the UE to establish a connection with the cell based at least in part on at least one of: the UE supporting one or more capabilities associated with connecting with the cell, or no cells that support reduced capability UEs being available, as described above.

Process 900 may include additional aspects, such as any single aspect or any combination of aspects described below and/or in connection with one or more other processes described elsewhere herein.

In a first aspect, the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

In a second aspect, alone or in combination with the first aspect, process 900 includes receiving, from the UE, an indication that the UE is operating in the second mode based at least in part on establishing the connection with the cell.

In a third aspect, alone or in combination with one or more of the first and second aspects, transmitting the indication comprises receiving, to the core network, the indication via NAS signaling.

In a fourth aspect, alone or in combination with one or more of the first through third aspects, transmitting the indication comprises receiving, via an AMF associated with the core network, the indication that the UE is operating in the second mode.

In a fifth aspect, alone or in combination with one or more of the first through fourth aspects, process 900 includes receiving one or more capability reports indicating one or more capabilities associated with the UE, wherein the one or more capabilities include a first one or more capabilities associated with operating in the first mode or a second one or more capabilities associated with operating in the second mode.

In a sixth aspect, alone or in combination with one or more of the first through fifth aspects, receiving the one or more capability reports comprises receiving a first capability report associated with operating in the first mode, and receiving a second capability report associated with operating in the second mode.

In a seventh aspect, alone or in combination with one or more of the first through sixth aspects, one or more capability reports are a single capability report, and wherein the single capability report includes one or more NCE fields, and wherein the first one or more capabilities associated with operating in the first mode are indicated in the one or more NCE fields.

In an eighth aspect, alone or in combination with one or more of the first through seventh aspects, the first one or more capabilities associated with operating in the first mode include at least one of a first capability that is mandatory for cells that do not support reduced capability UEs and optional for cells that do support reduced capability UEs, or a second capability that is optional for both for cells that do support reduced capability UEs and cells that do not support reduced capability UEs.

In a ninth aspect, alone or in combination with one or more of the first through eighth aspects, the one or more capability reports indicate that the UE supports operating in the first mode and in the second mode.

In a tenth aspect, alone or in combination with one or more of the first through ninth aspects, process 900 includes receiving, from the UE via an NAS message, an indication that the UE is operating in the first mode based at least in part on the UE performing a handover procedure to connect with a different cell in the first mode, wherein the different cell does support reduced capability UEs.

In an eleventh aspect, alone or in combination with one or more of the first through tenth aspects, process 900 includes transmitting, to the UE via an NAS message, an indication to reselect to a new cell that does support reduced capability UEs based at least in part on the UE performing a handover procedure to connect with a different cell, wherein the different cell does not support reduced capability UEs.

In a twelfth aspect, alone or in combination with one or more of the first through eleventh aspects, the first mode is associated with a first hardware capability of the UE that is associated with a reduced capability, and wherein the second mode is associated with a second hardware capability of the UE that is not associated with a reduced capability.

In a thirteenth aspect, alone or in combination with one or more of the first through twelfth aspects, process 900 includes transmitting subscription information, associated with a subscription of the UE, that indicates that the UE is capable of operating in the first mode and the second mode.

In a fourteenth aspect, alone or in combination with one or more of the first through thirteenth aspects, process 900 includes receiving, from the UE, an indication that the UE is capable of operating in the first mode and the second mode, and transmitting, to the UE, an access policy associated with the UE operating in the first mode or the second mode based at least in part on transmitting the indication.

In a fifteenth aspect, alone or in combination with one or more of the first through fourteenth aspects, the access policy indicates whether the first mode or the second mode is to be prioritized for operations of the UE.

In a sixteenth aspect, alone or in combination with one or more of the first through fifteenth aspects, process 900 includes receiving, from the UE, an indication that the UE is operating in the second mode based at least in part on the UE establishing a connection with a cell that does not support reduced capability UEs.

In a seventeenth aspect, alone or in combination with one or more of the first through sixteenth aspects, the UE is associated with a first set of capabilities for the first mode and a second set of capabilities for the second mode.

In an eighteenth aspect, alone or in combination with one or more of the first through seventeenth aspects, process 900 includes receiving, from the UE, an indication of the first set of capabilities and an indication of the second set of capabilities.

In a nineteenth aspect, alone or in combination with one or more of the first through eighteenth aspects, process 900 includes receiving an indication of the first set of capabilities if the UE is operating in the first mode, or receiving an indication of the second set of capabilities if the UE is operating in the second mode.

In a twentieth aspect, alone or in combination with one or more of the first through nineteenth aspects, process 900 includes receiving, from the UE via an NAS message, an indication that the UE is operating in the first mode based at least in part on the UE performing a handover procedure to connect with a different cell in the first mode, wherein the different cell does support reduced capability UEs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
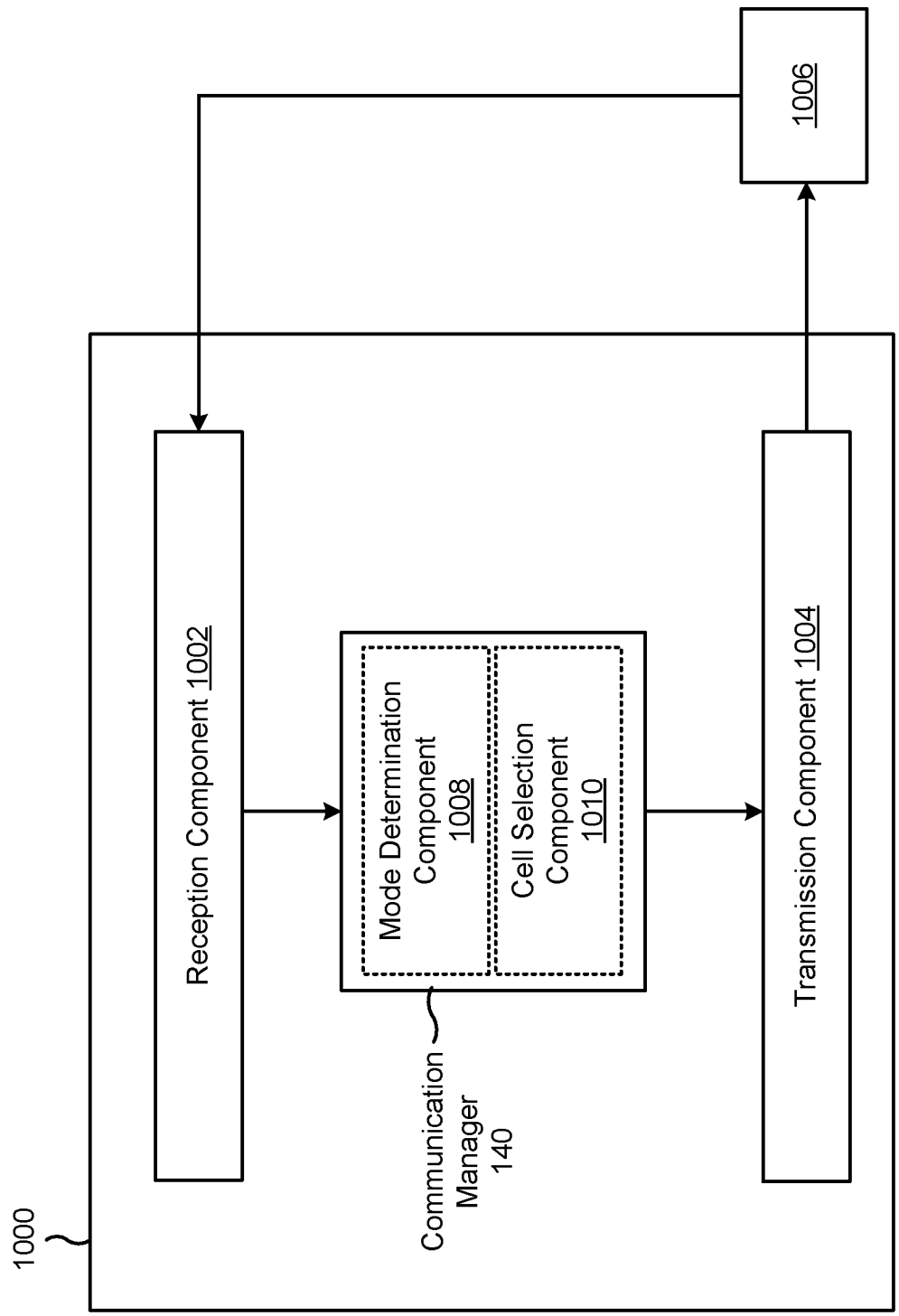
FIGS. 10-12 are diagrams of example apparatuses for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a mode determination component 1008, and/or a cell selection component 1010, among other examples.

In some aspects, the apparatus 1000 may be configured to perform one or more operations described herein in connection with FIGS. 5 and 6. Additionally, or alternatively, the apparatus 1000 may be configured to perform one or more processes described herein, such as process 700 of FIG. 7, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive, from a base station, an indication that a cell associated with the base station does not support reduced capability UEs, wherein the UE is capable of operating in a first mode that is associated with reduced capability UEs and a second mode that is not associated with reduced capability UEs. The reception component 1002 and/or the transmission component 1004 may communicate, in the second mode, with the base station to establish a connection with the cell based at least in part on at least one of the UE supporting one or more capabilities associated with connecting with the cell, or no cells that support reduced capability UEs being available.

The mode determination component 1008 may determine a mode, from the first mode and the second mode, in which to operate based at least in part on a cell that the UE is connected to.

The cell selection component 1010 may perform a cell selection procedure or a cell re-selection procedure to identify the cell based at least in part on prioritizing cells that support reduced capability UEs over cells that do not support reduced capability UEs for the cell selection procedure or the cell re-selection procedure.

The reception component 1002 may receive, from another cell, an indication that reduced capability UEs are barred from connecting with the other cell.

The cell selection component 1010, the reception component 1002 and/or the transmission component 1004 may refrain from establishing a connection, in the second mode, with the other cell regardless of whether the UE supports one or more other capabilities associated with connecting with the other cell.

The transmission component 1004 may transmit, to a core network, an indication that the UE is operating in the second mode based at least in part on establishing the connection with the cell.

The transmission component 1004 may transmit one or more capability reports indicating one or more capabilities associated with the UE, wherein the one or more capabilities include a first one or more capabilities associated with operating in the first mode or a second one or more capabilities associated with operating in the second mode.

The cell selection component 1010, the reception component 1002 and/or the transmission component 1004 may perform a handover procedure to connect with a different cell in the first mode, wherein the different cell does support reduced capability UEs.

The transmission component 1004 may transmit, to a core network via an NAS message, an indication that the UE is operating in the first mode based at least in part on performing the handover procedure.

The reception component 1002 and/or the transmission component 1004 may establish, in the first mode, a different connection with a different cell that does support reduced capability UEs.

The reception component 1002 may receive, from the different cell, a handover configuration indicating at least one of a first one or more target cells that support reduced capability UEs; or a second one or more target cells, that do not support reduced capability UEs, based at least in part on no target cells that support reduced capability UEs being available.

The reception component 1002 and/or the transmission component 1004 may perform a handover procedure to connect with a different cell in the second mode, wherein the different cell does not support reduced capability UEs.

The cell selection component 1010, the reception component 1002 and/or the transmission component 1004 may perform an action to maintain a connection with the different cell or select a new cell.

The cell selection component 1010, the reception component 1002 and/or the transmission component 1004 may perform a handover procedure to connect with a different cell, wherein the different cell does not support reduced capability UEs.

The reception component 1002 may receive, via an NAS message, an indication to reselect to a new cell that does support reduced capability UEs.

The cell selection component 1010, the reception component 1002 and/or the transmission component 1004 may establish a connection with the new cell based at least in part on receiving the NAS message.

The reception component 1002 may receive subscription information, associated with a subscription of the UE, that indicates that the UE is capable of operating in the first mode and the second mode.

The transmission component 1004 may transmit, to a core network, an indication that the UE is capable of operating in the first mode and the second mode.

The reception component 1002 may receive, from the core network, an access policy associated with the UE operating in the first mode or the second mode based at least in part on transmitting the indication.

The cell selection component 1010 may perform a cell selection procedure to select either a first cell that does not support reduced capability UEs or a second cell that does support reduced capability UEs.

The reception component 1002 and/or the transmission component 1004 may operate in the first mode or the second mode based at least in part on whether the first cell or the second cell is selected.

The transmission component 1004 may transmit, to a core network, an indication that the UE is operating in the second mode based at least in part on establishing the connection with the cell that does not support reduced capability UEs.

The transmission component 1004 may transmit, to a core network, an indication of the first set of capabilities and an indication of the second set of capabilities.

The transmission component 1004 may transmit an indication of the first set of capabilities if the UE is operating in the first mode.

The transmission component 1004 may transmit an indication of the second set of capabilities if the UE is operating in the second mode.

The cell selection component 1010, the reception component 1002 and/or the transmission component 1004 may perform a handover procedure to connect with a different cell in the first mode, wherein the different cell does support reduced capability UEs.

The transmission component 1004 may transmit, to a core network via an NAS message, an indication that the UE is operating in the first mode based at least in part on performing the handover procedure.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
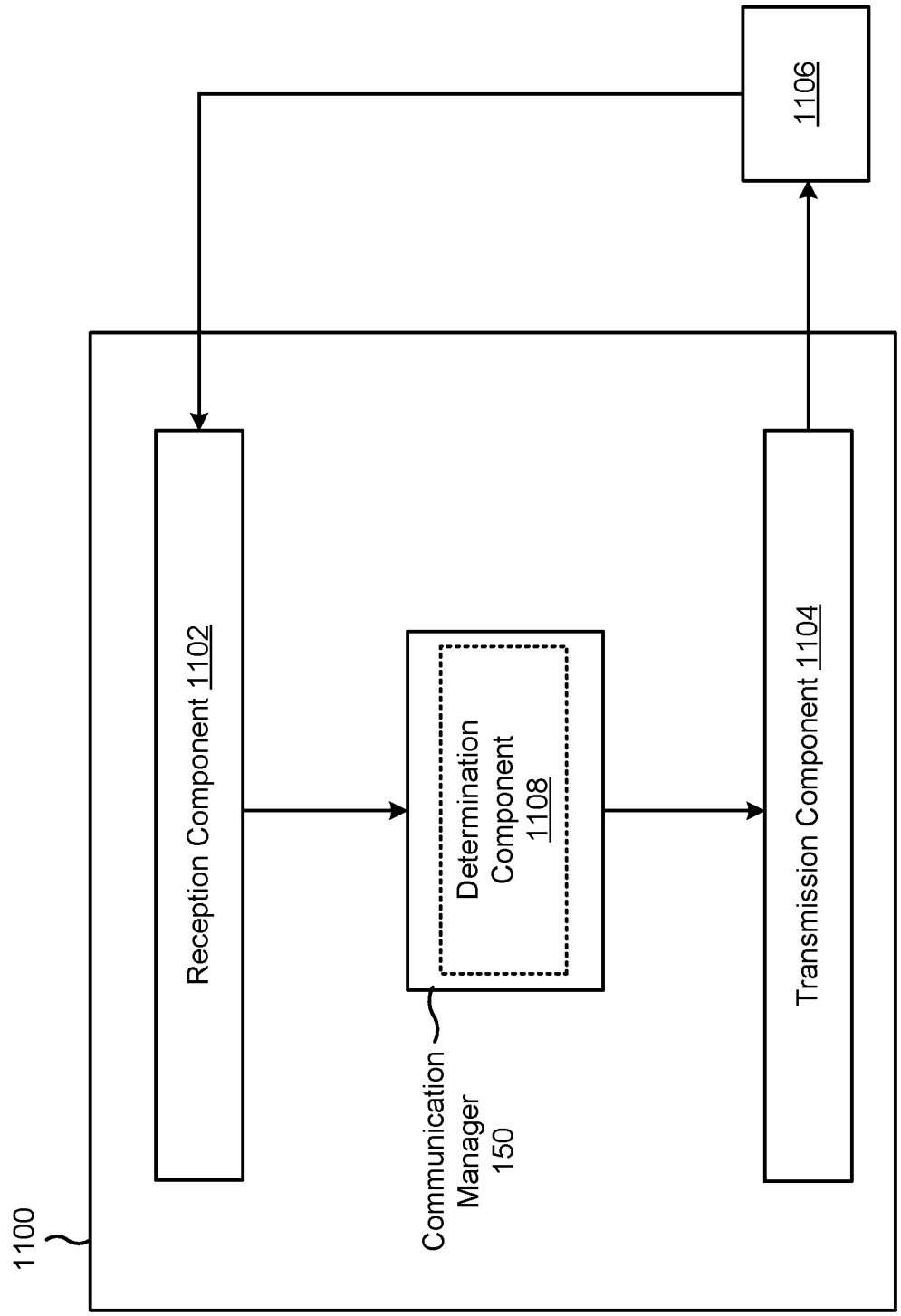

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include a determination component 1108, among other examples.

In some aspects, the apparatus 1100 may be configured to perform one or more operations described herein in connection with FIGS. 5 and 6. Additionally, or alternatively, the apparatus 1100 may be configured to perform one or more processes described herein, such as process 800 of FIG. 8, or a combination thereof. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit, to a UE, an indication that a cell associated with the base station does not support reduced capability UEs, wherein the UE is capable of operating in a first mode that is associated with reduced capability UEs and a second mode that is not associated with reduced capability UEs. The reception component 1102 and/or the transmission component 1104 may communicate, with the UE that is operating in the second mode, to establish a connection with the UE based at least in part on at least one of the UE supporting one or more capabilities associated with connecting with the cell, or no cells that support reduced capability UEs being available.

The reception component 1102 may receive, from a core network, an indication that the UE is operating in the second mode based at least in part on establishing the connection with the cell.

The reception component 1102 may receive one or more capability reports indicating one or more capabilities associated with the UE, wherein the one or more capabilities include a first one or more capabilities associated with operating in the first mode or a second one or more capabilities associated with operating in the second mode.

The reception component 1102 may receive subscription information, associated with a subscription of the UE, that indicates that the UE is capable of operating in the first mode and the second mode.

The determination component 1108 may determine a handover configuration or a target cell for a handover procedure associated with the UE. The determination component 1108 may determine the handover configuration or the target cell for a handover procedure based at least in part on an access policy associated with the UE.

The reception component 1102 may receive an indication of the first set of capabilities if the UE is operating in the first mode.

The reception component 1102 may receive an indication of the second set of capabilities if the UE is operating in the second mode.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
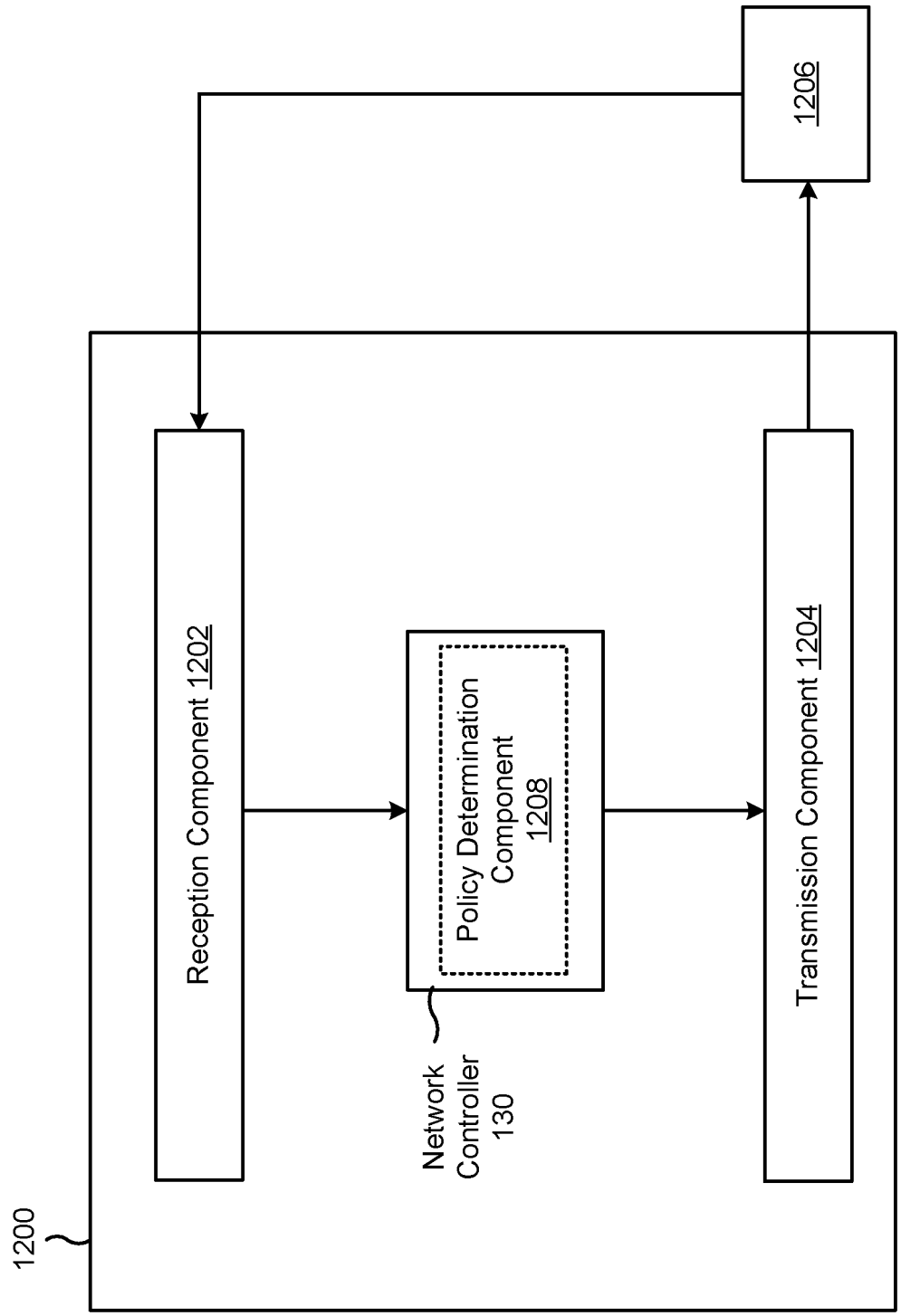

FIG. 12 is a diagram of an example apparatus 1200 for wireless communication. The apparatus 1200 may be a core network device, or a core network device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the network controller 130. The network controller 130 may include a policy determination component 1208, among other examples.

In some aspects, the apparatus 1200 may be configured to perform one or more operations described herein in connection with FIGS. 5 and 6. Additionally, or alternatively, the apparatus 1200 may be configured to perform one or more processes described herein, such as process 900 of FIG. 9, or a combination thereof. In some aspects, the apparatus 1200 and/or one or more components shown in FIG. 12 may include one or more components of the core network device described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the core network device described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the core network device described in connection with FIG. 2. In some aspects, the transmission component 1204 may be co-located with the reception component 1202 in a transceiver.

The reception component 1202 may receive, from a UE, an indication the UE is capable of operating in a first mode that is associated with reduced capability UEs and a second mode that is not associated with reduced capability UEs. The reception component 1202 and/or the transmission component 1204 may communicate, with the UE and/or a cell, to enable the UE to establish a connection with the cell based at least in part on at least one of the UE supporting one or more capabilities associated with connecting with the cell, or no cells that support reduced capability UEs being available.

The reception component 1202 may receive, from the UE, an indication that the UE is operating in the second mode based at least in part on establishing the connection with the cell.

The reception component 1202 may receive one or more capability reports indicating one or more capabilities associated with the UE, wherein the one or more capabilities include a first one or more capabilities associated with operating in the first mode or a second one or more capabilities associated with operating in the second mode.

The reception component 1202 may receive, from the UE via an NAS message, an indication that the UE is operating in the first mode based at least in part on the UE performing a handover procedure to connect with a different cell in the first mode, wherein the different cell does support reduced capability UEs.

The transmission component 1204 may transmit, to the UE via an NAS message, an indication to reselect to a new cell that does support reduced capability UEs based at least in part on the UE performing a handover procedure to connect with a different cell, wherein the different cell does not support reduced capability UEs.

The transmission component 1204 may transmit subscription information, associated with a subscription of the UE, that indicates that the UE is capable of operating in the first mode and the second mode.

The reception component 1202 may receive, from the UE, an indication that the UE is capable of operating in the first mode and the second mode.

The transmission component 1204 may transmit, to the UE, an access policy associated with the UE operating in the first mode or the second mode based at least in part on transmitting the indication. The policy determination component 1208 may determine the access policy based at least in part on the UE being capable of operating in the first mode and the second mode.

The reception component 1202 may receive, from the UE, an indication that the UE is operating in the second mode based at least in part on the UE establishing a connection with a cell that does not support reduced capability UEs.

The reception component 1202 may receive, from the UE, an indication of the first set of capabilities and an indication of the second set of capabilities.

The reception component 1202 may receive an indication of the first set of capabilities if the UE is operating in the first mode.

The reception component 1202 may receive an indication of the second set of capabilities if the UE is operating in the second mode.

The reception component 1202 may receive, from the UE via an NAS message, an indication that the UE is operating in the first mode based at least in part on the UE performing a handover procedure to connect with a different cell in the first mode, wherein the different cell does support reduced capability UEs.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) MC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 13:
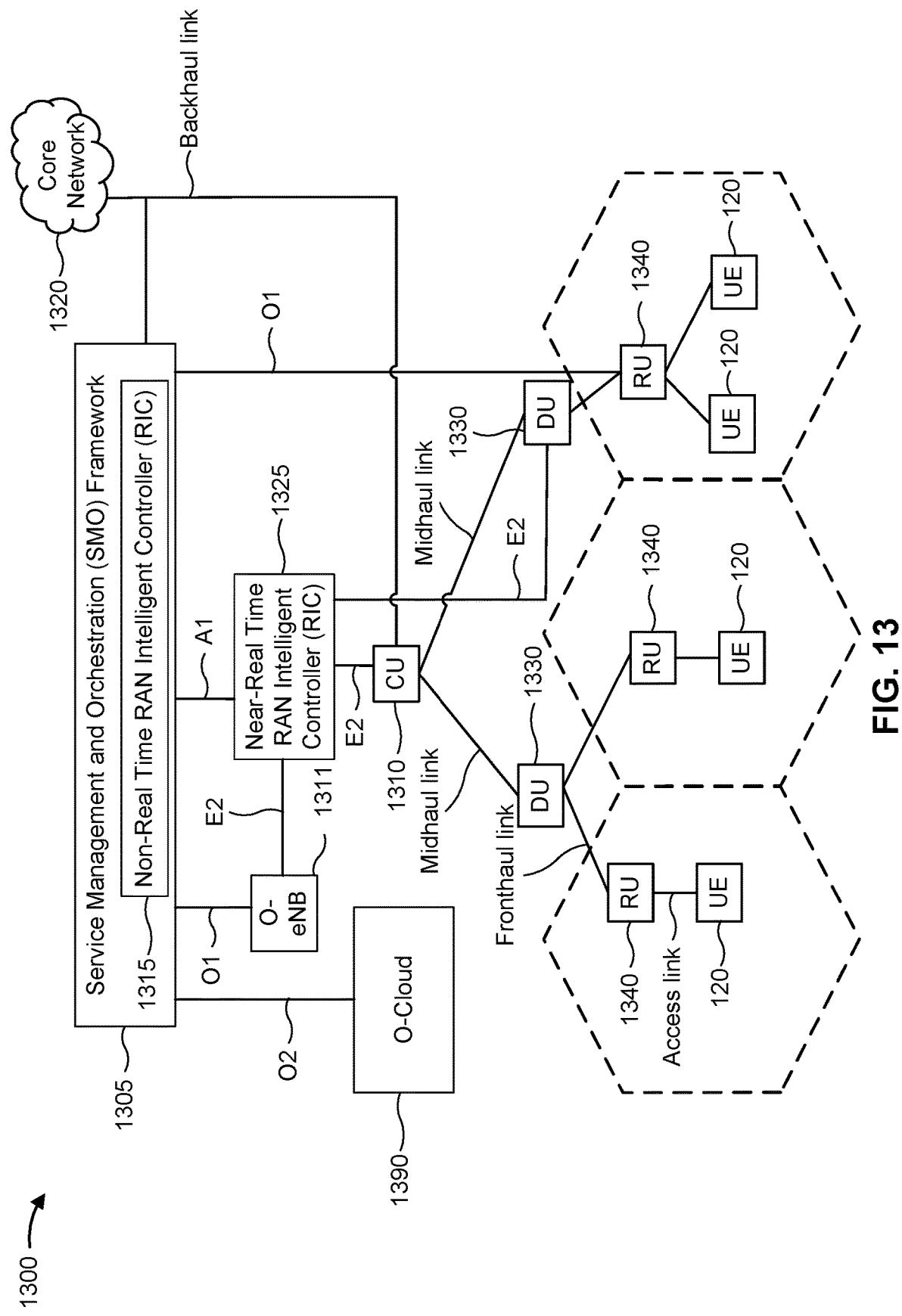
FIG. 13 is a diagram illustrating an example disaggregated base station architecture, in accordance with the present disclosure.

FIG. 13 is a diagram illustrating an example disaggregated base station architecture 1300, in accordance with the present disclosure. The disaggregated base station architecture 1300 may include a CU 1310 that can communicate directly with a core network 1320 via a backhaul link, or indirectly with the core network 1320 through one or more disaggregated control units (such as a Near-RT RIC 1325 via an E2 link, or a Non-RT RIC 1315 associated with a Service Management and Orchestration (SMO) Framework 1305, or both). A CU 1310 may communicate with one or more DUs 1330 via respective midhaul links, such as through F1 interfaces. Each of the DUs 1330 may communicate with one or more RUs 1340 via respective fronthaul links. Each of the RUs 1340 may communicate with one or more UEs 120 via respective radio frequency (RF) access links. In some implementations, a UE 120 may be simultaneously served by multiple RUs 1340.

Each of the units, including the CUs 1310, the DUs 1330, the RUs 1340, as well as the Near-RT RICs 1325, the Non-RT RICs 1315, and the SMO Framework 1305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 1310 may host one or more higher layer control functions. Such control functions can include RRC functions, PDCP functions, or SDAP functions, among other examples. Each control function can be implemented with an interface configured to communicate signals with other control functions hosted by the CU 1310. The CU 1310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 1310 can be logically split into one or more CU-UP units and one or more CU-CP units. A CU-UP unit can communicate bidirectionally with a CU-CP unit via an interface, such as the E1 interface when implemented in an O-RAN configuration. The CU 1310 can be implemented to communicate with a DU 1330, as necessary, for network control and signaling.

Each DU 1330 may correspond to a logical unit that includes one or more base station functions to control the operation of one or more RUs 1340. In some aspects, the DU 1330 may host one or more of an RLC layer, a MAC layer, and one or more high PHY layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 1330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 1330, or with the control functions hosted by the CU 1310.

Each RU 1340 may implement lower-layer functionality. In some deployments, an RU 1340, controlled by a DU 1330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 1340 can be operated to handle over the air (OTA) communication with one or more UEs 120. In some implementations, real-time and non-real-time aspects of control and user plane communication with the RU(s) 1340 can be controlled by the corresponding DU 1330. In some scenarios, this configuration can enable each DU 1330 and the CU 1310 to be implemented in a cloud-based RAN architecture, such as a vRAN architecture.

The SMO Framework 1305 may be configured to support RAN deployment and provisioning of non-virtualized and virtualized network elements. For non-virtualized network elements, the SMO Framework 1305 may be configured to support the deployment of dedicated physical resources for RAN coverage requirements, which may be managed via an operations and maintenance interface (such as an O1 interface). For virtualized network elements, the SMO Framework 1305 may be configured to interact with a cloud computing platform (such as an open cloud (O-Cloud) platform 1390) to perform network element life cycle management (such as to instantiate virtualized network elements) via a cloud computing platform interface (such as an O2 interface). Such virtualized network elements can include, but are not limited to, CUs 1310, DUs 1330, RUs 1340, non-RT RICs 1315, and Near-RT RICs 1325. In some implementations, the SMO Framework 1305 can communicate with a hardware aspect of a 4G RAN, such as an open eNB (O-eNB) 1311, via an O1 interface. Additionally, in some implementations, the SMO Framework 1305 can communicate directly with each of one or more RUs 1340 via a respective O1 interface. The SMO Framework 1305 also may include a Non-RT RIC 1315 configured to support functionality of the SMO Framework 1305.

The Non-RT RIC 1315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1325. The Non-RT RIC 1315 may be coupled to or communicate with (such as via an A1 interface) the Near-RT RIC 1325. The Near-RT RIC 1325 may be configured to include a logical function that enables near-real-time control and optimization of RAN elements and resources via data collection and actions over an interface (such as via an E2 interface) connecting one or more CUs 1310, one or more DUs 1330, or both, as well as an O-eNB, with the Near-RT RIC 1325.

In some implementations, to generate AI/ML models to be deployed in the Near-RT RIC 1325, the Non-RT RIC 1315 may receive parameters or external enrichment information from external servers. Such information may be utilized by the Near-RT RIC 1325 and may be received at the SMO Framework 1305 or the Non-RT MC 1315 from non-network data sources or from network functions. In some examples, the Non-RT MC 1315 or the Near-RT MC 1325 may be configured to tune RAN behavior or performance. For example, the Non-RT MC 1315 may monitor long-term trends and patterns for performance and employ AI/ML, models to perform corrective actions through the SMO Framework 1305 (such as reconfiguration via an O1 interface) or via creation of RAN management policies (such as A1 interface policies).

As indicated above, FIG. 13 is provided as an example. Other examples may differ from what is described with regard to FIG. 13.

The following provides an overview of some Aspects of the present disclosure:

Aspect 1: A method of wireless communication performed by a user equipment (UE), comprising: receiving, from a base station, an indication that a cell associated with the base station does not support reduced capability UEs, wherein the UE is capable of operating in a first mode that is associated with reduced capability UEs and a second mode that is not associated with reduced capability UEs; and communicating, in the second mode, with the base station to establish a connection with the cell based at least in part on at least one of: the UE supporting one or more capabilities associated with connecting with the cell, or no cells that support reduced capability UEs being available.

Aspect 2: The method of Aspect 1, wherein the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

Aspect 3: The method of any of Aspects 1-2, further comprising: performing a cell selection procedure or a cell re-selection procedure to identify the cell based at least in part on prioritizing cells that support reduced capability UEs over cells that do not support reduced capability UEs for the cell selection procedure or the cell re-selection procedure.

Aspect 4: The method of any of Aspects 1-3, further comprising: receiving, from another cell, an indication that reduced capability UEs are barred from connecting with the other cell; and refraining from establishing a connection, in the second mode, with the other cell regardless of whether the UE supports one or more other capabilities associated with connecting with the other cell.

Aspect 5: The method of any of Aspects 1-4, further comprising: transmitting, to a core network, an indication that the UE is operating in the second mode based at least in part on establishing the connection with the cell.

Aspect 6: The method of Aspect 5, wherein transmitting the indication comprises: transmitting, to the core network, the indication via non-access stratum (NAS) signaling.

Aspect 7: The method of any of Aspects 5-6, wherein transmitting the indication comprises: transmitting, to an access and mobility function (AMF) associated with the core network, the indication that the UE is operating in the second mode.

Aspect 8: The method of any of Aspects 1-7, further comprising: transmitting one or more capability reports indicating one or more capabilities associated with the UE, wherein the one or more capabilities include a first one or more capabilities associated with operating in the first mode or a second one or more capabilities associated with operating in the second mode.

Aspect 9: The method of Aspect 8, wherein transmitting the one or more capability reports comprises: transmitting a first capability report associated with operating in the first mode; and transmitting a second capability report associated with operating in the second mode.

Aspect 10: The method of any of Aspects 8-9, wherein one or more capability reports are a single capability report, and wherein the single capability report includes one or more non-critical extension (NCE) fields, and wherein the first one or more capabilities associated with operating in the first mode are indicated in the one or more NCE fields.

Aspect 11: The method of any of Aspects 8-10, wherein the first one or more capabilities associated with operating in the first mode include at least one of: a first capability that is mandatory for cells that do not support reduced capability UEs and optional for cells that do support reduced capability UEs; or a second capability that is optional for both for cells that do support reduced capability UEs and cells that do not support reduced capability UEs.

Aspect 12: The method of any of Aspects 8-11, wherein the one or more capability reports indicate that the UE supports operating in the first mode and in the second mode.

Aspect 13: The method of any of Aspects 1-12, further comprising: performing a handover procedure to connect with a different cell in the first mode, wherein the different cell does support reduced capability UEs; and transmitting, to a core network via a non-access stratum (NAS) message, an indication that the UE is operating in the first mode based at least in part on performing the handover procedure.

Aspect 14: The method of any of Aspects 1-13, further comprising: establishing, in the first mode, a different connection with a different cell that does support reduced capability UEs; and receiving, from the different cell, a handover configuration indicating at least one of: a first one or more target cells that support reduced capability UEs; or a second one or more target cells, that do not support reduced capability UEs, based at least in part on no target cells that support reduced capability UEs being available.

Aspect 15: The method of any of Aspects 1-14, further comprising: performing a handover procedure to connect with a different cell in the second mode, wherein the different cell does not support reduced capability UEs; and performing an action to maintain a connection with the different cell or select a new cell.

Aspect 16: The method of Aspect 15, wherein the action is based at least in part on at least one of: whether any cells that support reduced capability UEs are available, or an application type associated with traffic being communicated by the UE.

Aspect 17: The method of any of Aspects 15-16, wherein performing the action comprises: performing a radio resource control (RRC) re-establishment procedure to select the new cell.

Aspect 18: The method of any of Aspects 1-17, further comprising: performing a handover procedure to connect with a different cell, wherein the different cell does not support reduced capability UEs; and receiving, via a non-access stratum (NAS) message, an indication to reselect to a new cell that does support reduced capability UEs.

Aspect 19: The method of Aspect 18, further comprising: establishing a connection with the new cell based at least in part on receiving the NAS message.

Aspect 20: The method of any of Aspects 1 and 3-19, wherein the first mode is associated with a first hardware capability of the UE that is associated with a reduced capability, and wherein the second mode is associated with a second hardware capability of the UE that is not associated with a reduced capability.

Aspect 21: The method of Aspect 20, wherein communicating to establish the connection with the cell comprises: communicating, based at least in part on operating in the second mode, to establish the connection with the cell.

Aspect 22: The method of any of Aspects 20-21, further comprising: receiving subscription information, associated with a subscription of the UE, that indicates that the UE is capable of operating in the first mode and the second mode.

Aspect 23: The method of any of Aspects 20-22, further comprising: transmitting, to a core network, an indication that the UE is capable of operating in the first mode and the second mode; and receiving, from the core network, an access policy associated with the UE operating in the first mode or the second mode based at least in part on transmitting the indication.

Aspect 24: The method of Aspect 23, wherein the access policy indicates whether the first mode or the second mode is to be prioritized for operations of the UE.

Aspect 25: The method of any of Aspects 20-24, further comprising: performing a cell selection procedure to select either a first cell that does not support reduced capability UEs or a second cell that does support reduced capability UEs; and operating in the first mode or the second mode based at least in part on whether the first cell or the second cell is selected.

Aspect 26: The method of Aspect 25, wherein an access policy indicates that the first mode is to be prioritized, and wherein performing the cell selection procedure comprises: selecting the first cell or the second cell from at least one of: a first one or more cells that support reduced capability UEs, or a second one or more cells that do not support reduced capability UEs, if no cells that support reduced capability UEs are available.

Aspect 27: The method of any of Aspects 25-26, wherein an access policy indicates that the second mode is to be prioritized, and wherein performing the cell selection procedure comprises: selecting the first cell or the second cell from one or more cells that include cells that support reduced capability UEs or cells that do not support reduced capability UEs.

Aspect 28: The method of any of Aspects 20-27, further comprising: transmitting, to a core network, an indication that the UE is operating in the second mode based at least in part on establishing the connection with the cell that does not support reduced capability UEs.

Aspect 29: The method of any of Aspects 20-28, wherein the UE is associated with a first set of capabilities for the first mode and a second set of capabilities for the second mode.

Aspect 30: The method of Aspect 29, further comprising: transmitting, to a core network, an indication of the first set of capabilities and an indication of the second set of capabilities.

Aspect 31: The method of any of Aspects 29-30, further comprising: transmitting an indication of the first set of capabilities if the UE is operating in the first mode; or transmitting an indication of the second set of capabilities if the UE is operating in the second mode.

Aspect 32: The method of any of Aspects 20-31, wherein the UE is associated with an access policy that indicates whether the first mode or the second mode is to be prioritized for operations of the UE, the method further comprising: transmitting, to the cell, an indication of the access policy via a UE assistance information message; and receiving, from the cell, a handover configuration that is based at least in part on the access policy.

Aspect 33: The method of any of Aspects 20-32, further comprising: performing a handover procedure to connect with a different cell in the first mode, wherein the different cell does support reduced capability UEs; and transmitting, to a core network via a non-access stratum (NAS) message, an indication that the UE is operating in the first mode based at least in part on performing the handover procedure.

Aspect 34: A method of wireless communication performed by a base station, comprising: transmitting, to a user equipment (UE), an indication that a cell associated with the base station does not support reduced capability UEs, wherein the UE is capable of operating in a first mode that is associated with reduced capability UEs and a second mode that is not associated with reduced capability UEs; and communicating, with the UE that is operating in the second mode, to establish a connection with the UE based at least in part on at least one of: the UE supporting one or more capabilities associated with connecting with the cell, or no cells that support reduced capability UEs being available.

Aspect 35: The method of Aspect 34, wherein the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

Aspect 36: The method of any of Aspects 34-35, further comprising: receiving, from a core network, an indication that the UE is operating in the second mode based at least in part on establishing the connection with the cell.

Aspect 37: The method of Aspect 36, wherein receiving the indication comprises: receiving, from an access and mobility function (AMF) associated with the core network, the indication that the UE is operating in the second mode.

Aspect 38: The method of any of Aspects 34-37, further comprising: receiving one or more capability reports indicating one or more capabilities associated with the UE, wherein the one or more capabilities include a first one or more capabilities associated with operating in the first mode or a second one or more capabilities associated with operating in the second mode.

Aspect 39: The method of Aspect 38, wherein receiving the one or more capability reports comprises: receiving a first capability report associated with operating in the first mode; and receiving a second capability report associated with operating in the second mode.

Aspect 40: The method of any of Aspects 38-39, wherein one or more capability reports are a single capability report, and wherein the single capability report includes one or more non-critical extension (NCE) fields, and wherein the first one or more capabilities associated with operating in the first mode are indicated in the one or more NCE fields.

Aspect 41: The method of any of Aspects 38-40, wherein the first one or more capabilities associated with operating in the first mode include at least one of: a first capability that is mandatory for cells that do not support reduced capability UEs and optional for cells that do support reduced capability UEs; or a second capability that is optional for both for cells that do support reduced capability UEs and cells that do not support reduced capability UEs.

Aspect 42: The method of any of Aspects 38-41, wherein the one or more capability reports indicate that the UE supports operating in the first mode and in the second mode.

Aspect 43: The method of any of Aspects 34 and 36-42, wherein the first mode is associated with a first hardware capability of the UE that is associated with a reduced capability, and wherein the second mode is associated with a second hardware capability of the UE that is not associated with a reduced capability.

Aspect 44: The method of Aspect 43, wherein communicating to establish the connection with the UE comprises: communicating, based at least in part on the UE operating in the second mode, to establish the connection with the UE.

Aspect 45: The method of any of Aspects 43-44, further comprising: receiving subscription information, associated with a subscription of the UE, that indicates that the UE is capable of operating in the first mode and the second mode.

Aspect 46: The method of any of Aspects 43-45, wherein the UE is associated with a first set of capabilities for the first mode and a second set of capabilities for the second mode.

Aspect 47: The method of Aspect 46, further comprising: receiving an indication of the first set of capabilities if the UE is operating in the first mode; or receiving an indication of the second set of capabilities if the UE is operating in the second mode.

Aspect 48: The method of any of Aspects 43-47, wherein the UE is associated with an access policy that indicates whether the first mode or the second mode is to be prioritized for operations of the UE, the method further comprising: receiving, from the UE, an indication of the access policy via a UE assistance information message; and transmitting, to the UE, a handover configuration that is based at least in part on the access policy.

Aspect 49: A method of wireless communication performed by a core network device, comprising: receiving, from a user equipment (UE), an indication the UE is capable of operating in a first mode that is associated with reduced capability UEs and a second mode that is not associated with reduced capability UEs; and communicating, with the UE or a cell, to enable the UE to establish a connection with the cell based at least in part on at least one of: the UE supporting one or more capabilities associated with connecting with the cell, or no cells that support reduced capability UEs being available.

Aspect 50: The method of Aspect 49, wherein the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

Aspect 51: The method of any of Aspects 49-50, further comprising: receiving, from the UE, an indication that the UE is operating in the second mode based at least in part on establishing the connection with the cell.

Aspect 52: The method of Aspect 51, wherein transmitting the indication comprises: receiving, to the core network, the indication via non-access stratum (NAS) signaling.

Aspect 53: The method of any of Aspects 51-52, wherein transmitting the indication comprises: receiving, via an access and mobility function (AMF) associated with the core network, the indication that the UE is operating in the second mode.

Aspect 54: The method of any of Aspects 49-53, further comprising: receiving one or more capability reports indicating one or more capabilities associated with the UE, wherein the one or more capabilities include a first one or more capabilities associated with operating in the first mode or a second one or more capabilities associated with operating in the second mode.

Aspect 55: The method of Aspect 54, wherein receiving the one or more capability reports comprises: receiving a first capability report associated with operating in the first mode; and receiving a second capability report associated with operating in the second mode.

Aspect 56: The method of any of Aspects 54-55, wherein one or more capability reports are a single capability report, and wherein the single capability report includes one or more non-critical extension (NCE) fields, and wherein the first one or more capabilities associated with operating in the first mode are indicated in the one or more NCE fields.

Aspect 57: The method of any of Aspects 54-56, wherein the first one or more capabilities associated with operating in the first mode include at least one of: a first capability that is mandatory for cells that do not support reduced capability UEs and optional for cells that do support reduced capability UEs; or a second capability that is optional for both for cells that do support reduced capability UEs and cells that do not support reduced capability UEs.

Aspect 58: The method of any of Aspects 54-57, wherein the one or more capability reports indicate that the UE supports operating in the first mode and in the second mode.

Aspect 59: The method of any of Aspects 49-58, further comprising: receiving, from the UE via a non-access stratum (NAS) message, an indication that the UE is operating in the first mode based at least in part on the UE performing a handover procedure to connect with a different cell in the first mode, wherein the different cell does support reduced capability UEs.

Aspect 60: The method of any of Aspects 49-59, further comprising: transmitting, to the UE via a non-access stratum (NAS) message, an indication to reselect to a new cell that does support reduced capability UEs based at least in part on the UE performing a handover procedure to connect with a different cell, wherein the different cell does not support reduced capability UEs.

Aspect 61: The method of any of Aspects 49 and 51-60, wherein the first mode is associated with a first hardware capability of the UE that is associated with a reduced capability, and wherein the second mode is associated with a second hardware capability of the UE that is not associated with a reduced capability.

Aspect 62: The method of Aspect 61, further comprising: transmitting subscription information, associated with a subscription of the UE, that indicates that the UE is capable of operating in the first mode and the second mode.

Aspect 63: The method of any of Aspects 61-62, further comprising: receiving, from the UE, an indication that the UE is capable of operating in the first mode and the second mode; and transmitting, to the UE, an access policy associated with the UE operating in the first mode or the second mode based at least in part on transmitting the indication.

Aspect 64: The method of Aspect 63, wherein the access policy indicates whether the first mode or the second mode is to be prioritized for operations of the UE.

Aspect 65: The method of any of Aspects 61-64, further comprising: receiving, from the UE, an indication that the UE is operating in the second mode based at least in part on the UE establishing a connection with a cell that does not support reduced capability UEs.

Aspect 66: The method of any of Aspects 61-65, wherein the UE is associated with a first set of capabilities for the first mode and a second set of capabilities for the second mode.

Aspect 67: The method of Aspect 66, further comprising: receiving, from the UE, an indication of the first set of capabilities and an indication of the second set of capabilities.

Aspect 68: The method of any of Aspects 66-67, further comprising: receiving an indication of the first set of capabilities if the UE is operating in the first mode; or receiving an indication of the second set of capabilities if the UE is operating in the second mode.

Aspect 69: The method of any of Aspects 61-68, further comprising: receiving, from the UE via a non-access stratum (NAS) message, an indication that the UE is operating in the first mode based at least in part on the UE performing a handover procedure to connect with a different cell in the first mode, wherein the different cell does support reduced capability UEs.

Aspect 70: An apparatus for wireless communication at a device, comprising a processor; memory coupled with the processor; and instructions stored in the memory and executable by the processor to cause the apparatus to perform the method of one or more of Aspects 1-33.

Aspect 71: A device for wireless communication, comprising a memory and one or more processors coupled to the memory, the one or more processors configured to perform the method of one or more of Aspects 1-33.

Aspect 72: An apparatus for wireless communication, comprising at least one means for performing the method of one or more of Aspects 1-33.

Aspect 73: A non-transitory computer-readable medium storing code for wireless communication, the code comprising instructions executable by a processor to perform the method of one or more of Aspects 1-33.

Aspect 74: A non-transitory computer-readable medium storing a set of instructions for wireless communication, the set of instructions comprising one or more instructions that, when executed by one or more processors of a device, cause the device to perform the method of one or more of Aspects 1-33.

Aspect 75: An apparatus for wireless communication at a device, comprising a processor; memory coupled with the processor; and instructions stored in the memory and executable by the processor to cause the apparatus to perform the method of one or more of Aspects 34-48.

Aspect 76: A device for wireless communication, comprising a memory and one or more processors coupled to the memory, the one or more processors configured to perform the method of one or more of Aspects 34-48.

Aspect 77: An apparatus for wireless communication, comprising at least one means for performing the method of one or more of Aspects 34-48.

Aspect 78: A non-transitory computer-readable medium storing code for wireless communication, the code comprising instructions executable by a processor to perform the method of one or more of Aspects 34-48.

Aspect 79: A non-transitory computer-readable medium storing a set of instructions for wireless communication, the set of instructions comprising one or more instructions that, when executed by one or more processors of a device, cause the device to perform the method of one or more of Aspects 34-48.

Aspect 80: An apparatus for wireless communication at a device, comprising a processor; memory coupled with the processor; and instructions stored in the memory and executable by the processor to cause the apparatus to perform the method of one or more of Aspects 49-69.

Aspect 81: A device for wireless communication, comprising a memory and one or more processors coupled to the memory, the one or more processors configured to perform the method of one or more of Aspects 49-69.

Aspect 82: An apparatus for wireless communication, comprising at least one means for performing the method of one or more of Aspects 49-69.

Aspect 83: A non-transitory computer-readable medium storing code for wireless communication, the code comprising instructions executable by a processor to perform the method of one or more of Aspects 49-69.

Aspect 84: A non-transitory computer-readable medium storing a set of instructions for wireless communication, the set of instructions comprising one or more instructions that, when executed by one or more processors of a device, cause the device to perform the method of one or more of Aspects 49-69.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive, from a base station, an indication that a cell associated with the base station does not support reduced capability UEs, wherein the UE is capable of operating in a first mode that is associated with reduced capability UEs and a second mode that is not associated with reduced capability UEs; and
communicate, in the second mode, with the base station to establish a connection with the cell based at least in part on at least one of:
the UE supporting one or more capabilities associated with connecting with the cell, or
no cells that support reduced capability UEs being available.

2. The UE of claim 1, wherein the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

3. The UE of claim 1, wherein the one or more processors are further configured to:
receive, from another cell, an indication that reduced capability UEs are barred from connecting with the other cell; and
refrain from establishing a connection, in the second mode, with the other cell regardless of whether the UE supports one or more other capabilities associated with connecting with the other cell.

4. The UE of claim 1, wherein the one or more processors are further configured to:
transmit, to a core network, an indication that the UE is operating in the second mode based at least in part on establishing the connection with the cell.

5. The UE of claim 4, wherein the one or more processors, to transmit the indication, are configured to:
transmit, to the core network, the indication via non-access stratum (NAS) signaling.

6. The UE of claim 4, wherein the one or more processors, to transmit the indication, are configured to:
transmit, to an access and mobility function (AMF) associated with the core network, the indication that the UE is operating in the second mode.

7. The UE of claim 1, wherein the one or more processors are further configured to:
transmit one or more capability reports indicating one or more capabilities associated with the UE, wherein the one or more capabilities include a first one or more capabilities associated with operating in the first mode or a second one or more capabilities associated with operating in the second mode.

8. The UE of claim 1, wherein the one or more processors are further configured to:
perform a handover procedure to connect with a different cell in the first mode, wherein the different cell does support reduced capability UEs; and transmit, to a core network via a non-access stratum (NAS) message, an indication that the UE is operating in the first mode based at least in part on performing the handover procedure.

9. The UE of claim 1, wherein the one or more processors are further configured to:
   establish, in the first mode, a different connection with a different cell that does support reduced capability UEs; and
   receive, from the different cell, a handover configuration indicating at least one of:
      a first one or more target cells that support reduced capability UEs; or
      a second one or more target cells, that do not support reduced capability UEs, based at least in part on no target cells that support reduced capability UEs being available.

10. The UE of claim 1, wherein the one or more processors are further configured to:
    perform a handover procedure to connect with a different cell in the second mode, wherein the different cell does not support reduced capability UEs; and
    perform an action to maintain a connection with the different cell or select a new cell.

11. The UE of claim 1, wherein the one or more processors are further configured to:
    perform a handover procedure to connect with a different cell, wherein the different cell does not support reduced capability UEs; and
    receive, via a non-access stratum (NAS) message, an indication to reselect to a new cell that does support reduced capability UEs.

12. The UE of claim 1, wherein the first mode is associated with a first hardware capability of the UE that is associated with a reduced capability, and wherein the second mode is associated with a second hardware capability of the UE that is not associated with a reduced capability.

13. A base station for wireless communication, comprising:
    a memory; and
    one or more processors, coupled to the memory, configured to:
       transmit, to a user equipment (UE), an indication that a cell associated with the base station does not support reduced capability UEs, wherein the UE is capable of operating in a first mode that is associated with reduced capability UEs and a second mode that is not associated with reduced capability UEs; and
       communicate, with the UE that is operating in the second mode, to establish a connection with the UE based at least in part on at least one of:
          the UE supporting one or more capabilities associated with connecting with the cell, or
          no cells that support reduced capability UEs being available.

14. The base station of claim 13, wherein the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

15. The base station of claim 13, wherein the one or more processors are further configured to:
    receive one or more capability reports indicating one or more capabilities associated with the UE, wherein the one or more capabilities include a first one or more capabilities associated with operating in the first mode or a second one or more capabilities associated with operating in the second mode.

16. A method of wireless communication performed by a user equipment (UE), comprising:
    receiving, from a base station, an indication that a cell associated with the base station does not support reduced capability UEs, wherein the UE is capable of operating in a first mode that is associated with reduced capability UEs and a second mode that is not associated with reduced capability UEs; and
    communicating, in the second mode, with the base station to establish a connection with the cell based at least in part on at least one of:
       the UE supporting one or more capabilities associated with connecting with the cell, or
       no cells that support reduced capability UEs being available.

17. The method of claim 16, wherein the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

18. The method of claim 16, further comprising:
    receiving, from another cell, an indication that reduced capability UEs are barred from connecting with the other cell; and
    refraining from establishing a connection, in the second mode, with the other cell regardless of whether the UE supports one or more other capabilities associated with connecting with the other cell.

19. The method of claim 16, further comprising:
    transmitting, to a core network, an indication that the UE is operating in the second mode based at least in part on establishing the connection with the cell.

20. The method of claim 19, wherein transmitting the indication comprises:
    transmitting, to the core network, the indication via non-access stratum (NAS) signaling.

21. The method of claim 19, wherein transmitting the indication comprises:
    transmitting, to an access and mobility function (AMF) associated with the core network, the indication that the UE is operating in the second mode.

22. The method of claim 16, further comprising:
    transmitting one or more capability reports indicating one or more capabilities associated with the UE, wherein the one or more capabilities include a first one or more capabilities associated with operating in the first mode or a second one or more capabilities associated with operating in the second mode.

23. The method of claim 22, wherein transmitting the one or more capability reports comprises:
    transmitting a first capability report associated with operating in the first mode; and
    transmitting a second capability report associated with operating in the second mode.

24. The method of claim 22, wherein the first one or more capabilities associated with operating in the first mode include at least one of:
    a first capability that is mandatory for cells that do not support reduced capability UEs and optional for cells that do support reduced capability UEs; or a second capability that is optional for both for cells that do support reduced capability UEs and cells that do not support reduced capability UEs.

25. The method of claim 16, further comprising:
performing a handover procedure to connect with a different cell in the first mode, wherein the different cell does support reduced capability UEs; and
transmitting, to a core network via a non-access stratum (NAS) message, an indication that the UE is operating in the first mode based at least in part on performing the handover procedure.

26. The method of claim 16, further comprising:
establishing, in the first mode, a different connection with a different cell that does support reduced capability UEs; and
receiving, from the different cell, a handover configuration indicating at least one of:
  a first one or more target cells that support reduced capability UEs; or
  a second one or more target cells, that do not support reduced capability UEs, based at least in part on no target cells that support reduced capability UEs being available.

27. The method of claim 16, further comprising:
performing a handover procedure to connect with a different cell in the second mode, wherein the different cell does not support reduced capability UEs; and
performing an action to maintain a connection with the different cell or select a new cell.

28. The method of claim 27, wherein the action is based at least in part on at least one of:
  whether any cells that support reduced capability UEs are available, or
  an application type associated with traffic being communicated by the UE.

29. A method of wireless communication performed by a base station, comprising:
transmitting, to a user equipment (UE), an indication that a cell associated with the base station does not support reduced capability UEs, wherein the UE is capable of operating in a first mode that is associated with reduced capability UEs and a second mode that is not associated with reduced capability UEs; and
communicating, with the UE that is operating in the second mode, to establish a connection with the UE based at least in part on at least one of:
  the UE supporting one or more capabilities associated with connecting with the cell, or
  no cells that support reduced capability UEs being available.

30. The method of claim 29, wherein the UE is a reduced capability UE, wherein the first mode is associated with the UE operating as a reduced capability UE in connection with a cell that supports reduced capability UEs, and wherein the second mode is associated with the UE operating in accordance with non-reduced capability UE procedures with a cell that does not support reduced capability UEs.

* * * * *